US012040998B2

(12) United States Patent
Haghighat et al.

(10) Patent No.: US 12,040,998 B2
(45) Date of Patent: Jul. 16, 2024

(54) METHODS AND APPARATUSES FOR RELIABLE MULTI-TRANSMISSION SYSTEMS

(71) Applicant: INTERDIGITAL PATENT HOLDINGS, INC., Wilmington, DE (US)

(72) Inventors: Afshin Haghighat, Ile-Bizard (CA); Prasanna Herath Mudiyanselage, Laval (CA); Moon-il Lee, Melville, NY (US); Loic Canonne-Velasquez, Dorval (CA)

(73) Assignee: InterDigital Patent Holdings, Inc., Wilmington, DE (US)

( * ) Notice: Subject to any disclaimer, the term of this patent is extended or adjusted under 35 U.S.C. 154(b) by 333 days.

(21) Appl. No.: 17/421,649

(22) PCT Filed: Jan. 8, 2020

(86) PCT No.: PCT/US2020/012791
§ 371 (c)(1),
(2) Date: Jul. 8, 2021

(87) PCT Pub. No.: WO2020/146536
PCT Pub. Date: Jul. 16, 2020

(65) Prior Publication Data
US 2022/0077978 A1    Mar. 10, 2022

Related U.S. Application Data

(60) Provisional application No. 62/805,154, filed on Feb. 13, 2019, provisional application No. 62/790,347, filed on Jan. 9, 2019.

(51) Int. Cl.
*H04L 5/00* (2006.01)
*H04L 1/00* (2006.01)
*H04L 27/34* (2006.01)

(52) U.S. Cl.
CPC .......... *H04L 5/0035* (2013.01); *H04L 1/0071* (2013.01); *H04L 5/0005* (2013.01); *H04L 27/3405* (2013.01); *H04L 2001/0092* (2013.01)

(58) Field of Classification Search
CPC ... H04L 5/0035; H04L 1/0071; H04L 5/0005; H04L 27/3405; H04L 2001/0092
See application file for complete search history.

(56) References Cited

U.S. PATENT DOCUMENTS 6,892,341 B2    5/2005  Golitschek et al.
9,942,008 B1*   4/2018  Sun .................. H04W 52/0248
(Continued)

FOREIGN PATENT DOCUMENTS

| EP | 1 655 878 | 5/2006 |
| WO | 2004/036817 | 4/2004 |
| WO | 2018/030811 | 2/2018 |

OTHER PUBLICATIONS

IEEE Standard for Information technology—Telecommunications and information exchange between systems—Local and metropolitan area networks—Specific requirements; Part 11: Wireless LAN Medium Access Control (MAC) and Physical Layer (PHY) Specifications, IEEE Std. 802.11-2016 (Dec. 7, 2016).
(Continued)

*Primary Examiner* — Deepa Belur
(74) *Attorney, Agent, or Firm* — VOLPE KOENIG

(57) ABSTRACT

Described herein are methods and apparatuses for enhancing transmission reliability. A method may comprise determining to determining to transmit a plurality of repetitions of a data payload. Each repetition of the data payload may comprise a set of coded bit sequences. The method may further comprise determining a constellation for each of the repetitions of the data payload, and mapping, for each repetition of the data payload, the sets of coded bit sequences to respective sets of modulation symbols based on
(Continued)

the constellation. Each of the sets of modulation symbols may be different. The method may further comprise allocating time and frequency resources for transmitting the sets of modulation symbols and transmitting the sets of modulation symbols on a downlink channel using the allocated time and frequency resources.

18 Claims, 30 Drawing Sheets

(56) References Cited

U.S. PATENT DOCUMENTS

| | | | | |
|---|---|---|---|---|
| 2005/0163040 | A1* | 7/2005 | Wengerter | H04L 1/08 370/207 |
| 2011/0150109 | A1 | 6/2011 | Huang et al. | |
| 2012/0257689 | A1* | 10/2012 | Hong | H04L 1/0067 375/295 |
| 2017/0019289 | A1* | 1/2017 | Duan | H03M 13/255 |
| 2018/0278370 | A1* | 9/2018 | Jeong | H04L 1/0058 |
| 2019/0326937 | A1* | 10/2019 | Myung | H04L 1/0057 |
| 2020/0162964 | A1* | 5/2020 | Srinivasa | H04W 28/065 |
| 2020/0195488 | A1* | 6/2020 | Ye | H04W 24/08 |
| 2020/0351019 | A1* | 11/2020 | Yan | H04L 1/0041 |
| 2021/0297300 | A1* | 9/2021 | Zhang | H04L 27/2626 |

OTHER PUBLICATIONS

IEEE Standard for Information technology—Telecommunications and information exchange between systems—Local and metropolitan area networks—Specific requirements; Part 11: Wireless LAN Medium Access Control (MAC) and Physical Layer (PHY) Specifications; Amendment 4: Enhancements for Very High Throughput for Operation in Bands below 6GHz, IEEE Std 802.11ac-2013 (Dec. 11, 2013).

IEEE Standard for Information Technology—Telecommunications and information exchange between systems—Local and metropolitan area networks—Specific requirements; Part 11: Wireless LAN Medium Access Control (MAC) and Physical Layer (PHY) specifications; Amendment 5: Television White Spaces (TVWS) Operation, IEEE 802.11af-2013 (Dec. 11, 2013).

IEEE Standard for Information technology—Telecommunications and information exchange between systems—Local and metropolitan area networks—Specific requirements; Part 11: Wireless LAN Medium Access Control (MAC) and Physical Layer (PHY) Specifications; Amendment 5: Enhancements for Higher Throughput, IEEE Std 802.11n-2009 (Sep. 2009).

IEEE Standard for Information technology—Telecommunications and information exchange between systems Local and metropolitan area networks—Specific requirements; Part 11: Wireless LAN Medium Access Control (MAC) and Physical Layer (PHY) Specifications; Amendment 2: Sub 1 GHz License Exempt Operation, IEEE 802.11ah-2016 (Dec. 7, 2016).

Interdigital Inc., "Enhanced Reliability for Multi-TRP Transmission," 3GPP TSG RAN WG1 Ad-Hoc Meeting 1901, R1-1900808, Taipei, Taiwan (Jan. 21-25, 2019).

Interdigital Inc., "Link-level Evaluation for M-TRP Transmission," 3GPP TSG RAN WG1 #97, R1-1906860, Reno, USA (May 13-17, 2019).

Interdigital Inc., "Link-level Evaluation of Multi-TRP Schemes," 3GPP TSG RAN WG1 #96b, R1-1904860, Xi'an, China (Apr. 8-12, 2019).

Interdigital Inc., "On the Performance of Multi-TRP/Panel Transmission," 3GPP TSG RAN WG1 #98, R1-1908232, Prague, Czech Republic (Aug. 26-30, 2019).

Interdigital Inc., "Performance Evaluation of Multi-TRP Schemes," 3GPP TSG RAN WG1 Meeting 96, R1-1902614, Athens, Greece (Feb. 25-Mar. 1, 2019).

KDDI, "Constellation Re-arrangement for Repetition Transmission," 3GPP TSG RAN WG1 Meeting, R1-060509, Denver, USA (Feb. 13-17, 2006).

* cited by examiner

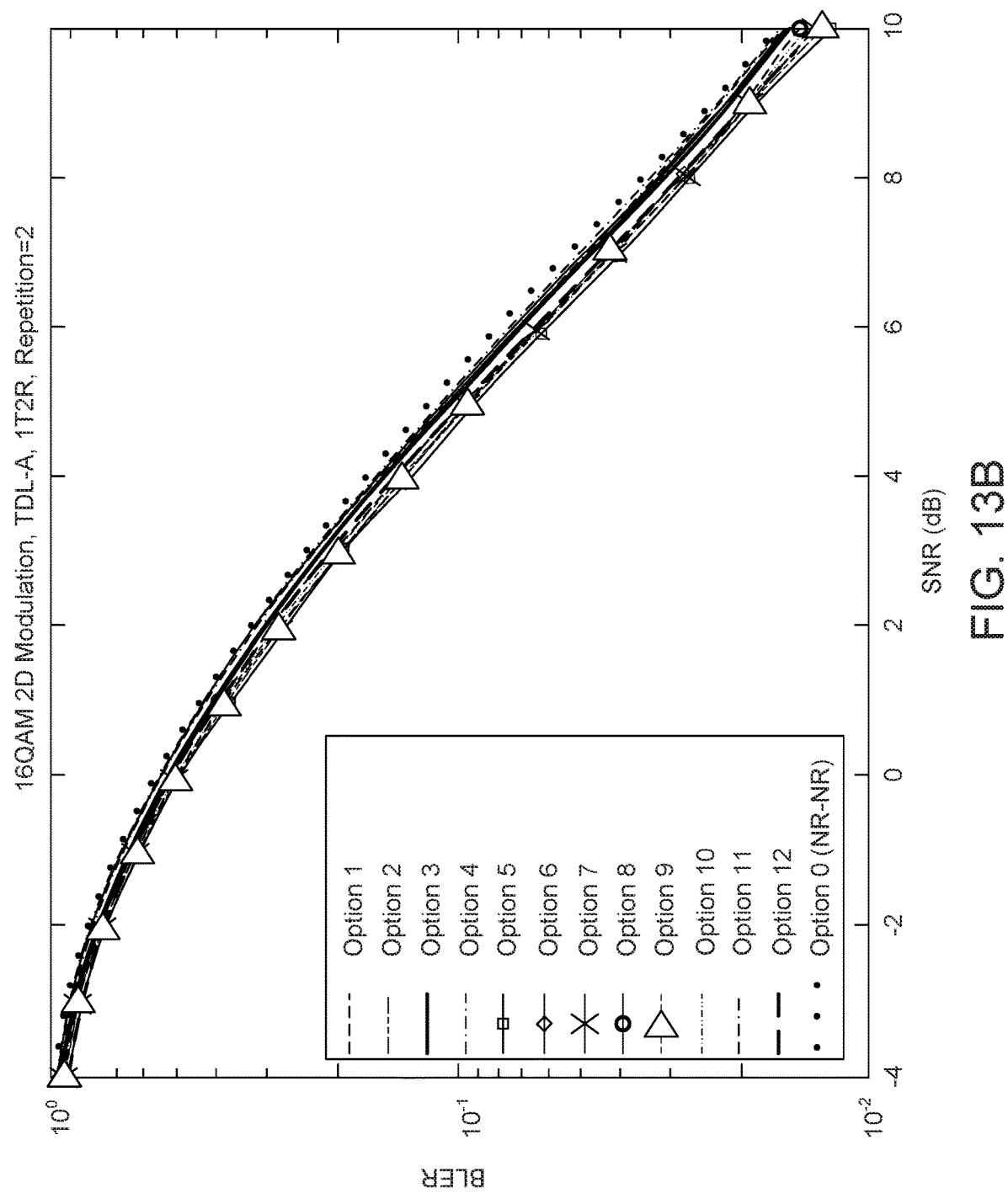

METHODS AND APPARATUSES FOR RELIABLE MULTI-TRANSMISSION SYSTEMS

CROSS REFERENCE TO RELATED APPLICATION

This application is the U.S. National Stage, under 35 U.S.C. § 371, of International Application No. PCT/US2020/012791, filed Jan. 8, 2020, which claims the benefit of U.S. Provisional Application No. 62/790,347, filed Jan. 9, 2019, and U.S. Provisional Application No. 62/805,154, filed Feb. 13, 2019, the contents of which are hereby incorporated herein by reference.

BACKGROUND

In New Radio (NR), Multi-Transmit/Receive Point (MTRP) operation is supported with an initial focus on downlink transmission. An NR wireless transmit/receive unit (WTRU) may be able to receive and process multiple transmissions via transmission channels, such as physical downlink control channels (NR-PDCCHs) and physical downlink shared channels (NR-PDSCHs). Two scenarios for downlink MTRP operation are presented where "P-TRP" and "S-TRP" refer to primary and secondary TRPs, respectively. In the first scenario, a single DCI transmission on a NR-PDCCH may schedule a single downlink transmission on a NR-PDSCH, for which separate layers may be transmitted from separate TRPs. In the second scenario, multiple NR-PDCCHs may each schedule a respective NR-PDSCH, and each NR-PDSCH may be transmitted from a separate TRP. One focus of NR is to support two NR-PDSCH transmissions per component carrier basis in the case of one bandwidth part, and two NR-PDCCH transmissions corresponding in a single slot.

One benefit of scenario 1 may be that, despite the transmission of multiple NR-PDSCH data layers, the complexity of WTRU blind search for DCI (Downlink Control Information) decoding remains similar to legacy systems since a WTRU may only need to decode one transmission received using a NR-PDCCH. However, scheduling decisions may be centrally coordinated at one gNB, requiring coordination between multiple TRPs. Also, beam link failure at the primary coordinating TRP could affect transmission at other TRPs since the WTRU may receive control information from one TRP for all TRPs in the coordinating set.

In scenario 2, using multiple NR-PDCCHs to send multiple DCI may yield greater scheduling flexibility at the TRPs. Each NR-PDCCH transmission can carry different scheduling instructions for the WTRU without being affected by the non-ideal backhaul. Therefore, there is less information that may need to be exchanged between cooperating TRPs over the backhaul. Also, the distributed scheduling provides diversity since beam link failure at one TRP only affects the resources managed by itself; transmissions at other TRPs can continue without any interruption. This may be an important factor for URLLC applications. On the other hand, since a WTRU may need to perform blind detection on multiple receive NR-PDCCH, the effective size of the search space may increase. Coordination remains an important aspect of operation to prevent collision of NR-PDCCHs transmitted by multiple TRPs.

Furthermore, in NR Release 15 Ultra-Reliable Low-Latency Communication (URLLC), PDSCH/PUSCH repetitions and transmission based on lower coding rates are specified. However, due to limited achieved gains and implications on delay to excessive repetitions, further enhancements may still be needed.

SUMMARY

Described herein are methods and apparatuses for enhancing transmission reliability. A method may comprise determining to transmit a plurality of repetitions of a data payload. Each repetition of the data payload may comprise a set of coded bit sequences. The method may further comprise determining a constellation for each of the repetitions of the data payload, and mapping, for each repetition of the data payload, the sets of coded bit sequences to respective sets of modulation symbols using the constellation. Each of the sets of modulations symbols may be different. The method may further comprise allocating time and frequency resources for transmitting the sets of modulation symbols and transmitting the sets of modulation symbols on a downlink channel using the allocated time and frequency resources.

BRIEF DESCRIPTION OF THE DRAWINGS

A more detailed understanding may be had from the following description, given by way of example in conjunction with the accompanying drawings, wherein like reference numerals in the figures indicate like elements, and wherein:

FIGS. 13A through 13C show performance enhancements achieved based using the multi-transmission protocol options presented in FIGS. 12A through 12M.

DETAILED DESCRIPTION

Figure 1A:
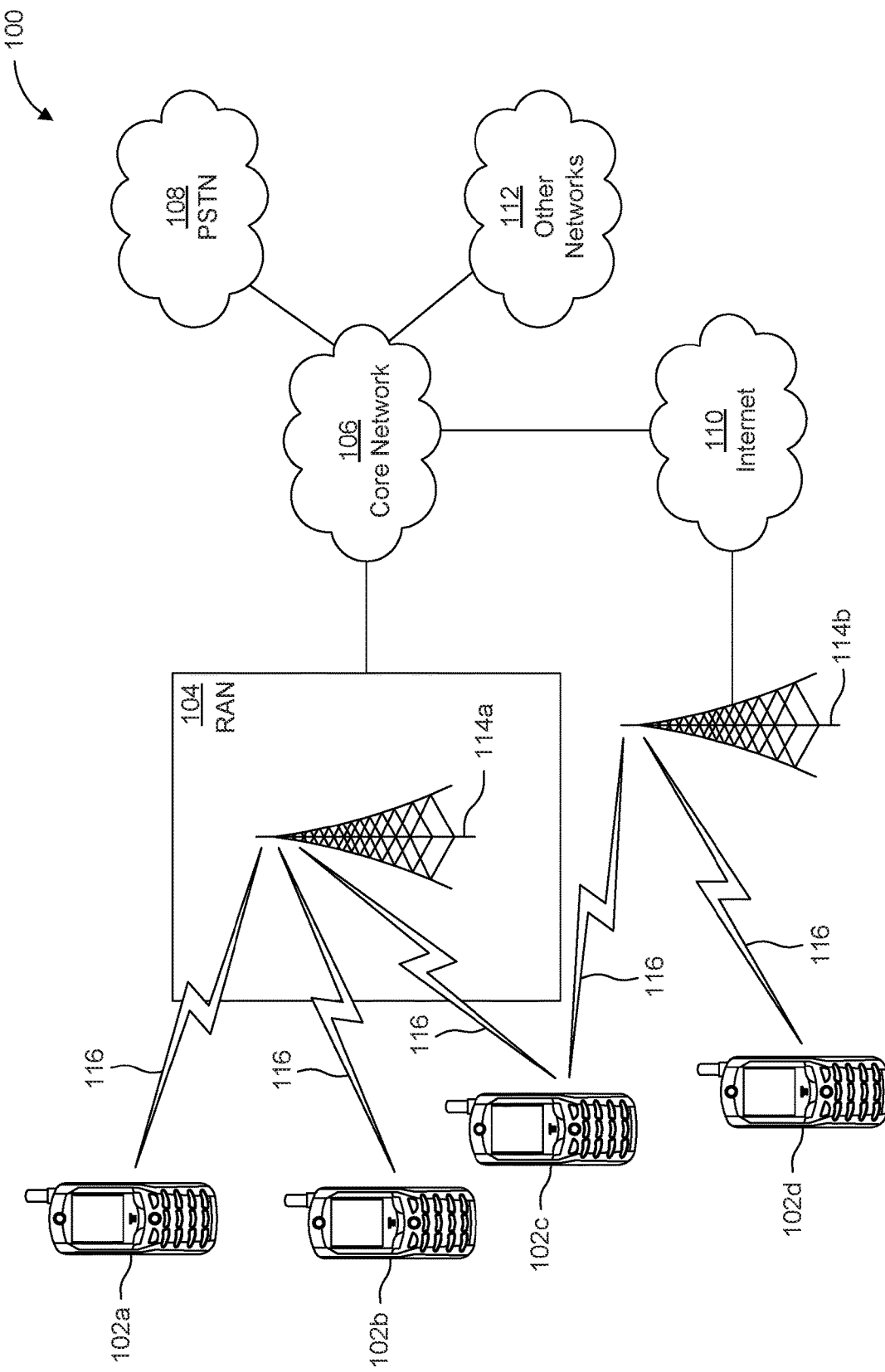
FIG. 1A is a system diagram illustrating an example communications system in which one or more disclosed embodiments may be implemented.

FIG. 1A is a diagram illustrating an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), zero-tail unique-word discrete Fourier transform Spread OFDM (ZT-UW-DFT-S-OFDM), unique word OFDM (UW-OFDM), resource block-filtered OFDM, filter bank multicarrier (FBMC), and the like.

As shown in FIG. 1A, the communications system 100 may include wireless transmit/receive units (WTRUs) 102a, 102b, 102c, 102d, a radio access network (RAN) 104, a core network (CN) 106, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, 102d may be any type of device configured to operate and/or communicate in a wireless environment. By way of example, the WTRUs 102a, 102b, 102c, 102d, any of which may be referred to as a station (STA), may be configured to transmit and/or receive wireless signals and may include a user equipment (UE), a mobile station, a fixed or mobile subscriber unit, a subscription-based unit, a pager, a cellular telephone, a personal digital assistant (PDA), a smartphone, a laptop, a netbook, a personal computer, a wireless sensor, a hotspot or Mi-Fi device, an Internet of Things (IoT) device, a watch or other wearable, a head-mounted display (HMD), a vehicle, a drone, a medical device and applications (e.g., remote surgery), an industrial device and applications (e.g., a robot and/or other wireless devices operating in an industrial and/or an automated processing chain contexts), a consumer electronics device, a device operating on commercial and/or industrial wireless networks, and the like. Any of the WTRUs 102a, 102b, 102c and 102d may be interchangeably referred to as a UE.

The communications systems 100 may also include a base station 114a and/or a base station 114b. Each of the base stations 114a, 114b may be any type of device configured to wirelessly interface with at least one of the WTRUs 102a, 102b, 102c, 102d to facilitate access to one or more communication networks, such as the CN 106, the Internet 110, and/or the other networks 112. By way of example, the base stations 114a, 114b may be a base transceiver station (BTS), a NodeB, an eNode B (eNB), a Home Node B, a Home eNode B, a next generation NodeB, such as a gNode B (gNB), a new radio (NR) NodeB, a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 104, which may also include other base stations and/or network elements (not shown), such as a base station controller (BSC), a radio network controller (RNC), relay nodes, and the like. The base station 114a and/or the base station 114b may be configured to transmit and/or receive wireless signals on one or more carrier frequencies, which may be referred to as a cell (not shown). These frequencies may be in licensed spectrum, unlicensed spectrum, or a combination of licensed and unlicensed spectrum. A cell may provide coverage for a wireless service to a specific geographical area that may be relatively fixed or that may change over time. The cell may further be divided into cell sectors. For example, the cell associated with the base station 114a may be divided into three sectors. Thus, in one embodiment, the base station 114a may include three transceivers, i.e., one for each sector of the cell. In an embodiment, the base station 114a may employ multiple-input multiple output (MIMO) technology and may utilize multiple transceivers for each sector of the cell. For example, beamforming may be used to transmit and/or receive signals in desired spatial directions.

The base stations 114a, 114b may communicate with one or more of the WTRUs 102a, 102b, 102c, 102d over an air interface 116, which may be any suitable wireless communication link (e.g., radio frequency (RF), microwave, centimeter wave, micrometer wave, infrared (IR), ultraviolet (UV), visible light, etc.). The air interface 116 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 104 and the WTRUs 102a, 102b, 102c may implement a radio technology such as Universal Mobile Telecommunications System (UMTS) Terrestrial Radio Access (UTRA), which may establish the air interface 116 using wideband CDMA (WCDMA). WCDMA may include communication protocols such as High-Speed Packet Access (HSPA) and/or Evolved HSPA (HSPA+). HSPA may include High-Speed Downlink (DL) Packet Access (HSDPA) and/or High-Speed Uplink (UL) Packet Access (HSUPA).

In an embodiment, the base station 114a and the WTRUs 102a, 102b, 102c may implement a radio technology such as Evolved UMTS Terrestrial Radio Access (E-UTRA), which may establish the air interface 116 using Long Term Evolution (LTE) and/or LTE-Advanced (LTE-A) and/or LTE-Advanced Pro (LTE-A Pro).

In an embodiment, the base station 114a and the WTRUs 102a, 102b, 102c may implement a radio technology such as NR Radio Access, which may establish the air interface 116 using NR.

In an embodiment, the base station 114a and the WTRUs 102a, 102b, 102c may implement multiple radio access technologies. For example, the base station 114a and the WTRUs 102a, 102b, 102c may implement LTE radio access and NR radio access together, for instance using dual connectivity (DC) principles. Thus, the air interface utilized by WTRUs 102a, 102b, 102c may be characterized by multiple types of radio access technologies and/or transmissions sent to/from multiple types of base stations (e.g., an eNB and a gNB).

In other embodiments, the base station 114a and the WTRUs 102a, 102b, 102c may implement radio technologies such as IEEE 802.11 (i.e., Wireless Fidelity (WiFi), IEEE 802.16 (i.e., Worldwide Interoperability for Microwave Access (WiMAX)), CDMA2000, CDMA2000 1×, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114b in FIG. 1A may be a wireless router, Home Node B, Home eNode B, or access point, for example, and may utilize any suitable RAT for facilitating wireless connectivity in a localized area, such as a place of business, a home, a vehicle, a campus, an industrial facility, an air corridor (e.g., for use by drones), a roadway, and the like. In one embodiment, the base station 114b and the WTRUs 102c, 102d may implement a radio technology such as IEEE 802.11 to establish a wireless local area network (WLAN). In an embodiment, the base station 114b and the WTRUs 102c, 102d may implement a radio technology such as IEEE 802.15 to establish a wireless personal area network (WPAN). In yet another embodiment, the base station 114b and the WTRUs 102c, 102d may utilize a cellular-based RAT (e.g., WCDMA, CDMA2000, GSM, LTE, LTE-A, LTE-A Pro, NR etc.) to establish a picocell or femtocell. As shown in FIG. 1A, the base station 114b may have a direct connection to the Internet 110. Thus, the base station 114b may not be required to access the Internet 110 via the CN 106.

The RAN 104 may be in communication with the CN 106, which may be any type of network configured to provide voice, data, applications, and/or voice over internet protocol (VoIP) services to one or more of the WTRUs 102a, 102b, 102c, 102d. The data may have varying quality of service (QoS) requirements, such as differing throughput requirements, latency requirements, error tolerance requirements, reliability requirements, data throughput requirements, mobility requirements, and the like. The CN 106 may provide call control, billing services, mobile location-based services, pre-paid calling, Internet connectivity, video distribution, etc., and/or perform high-level security functions, such as user authentication. Although not shown in FIG. 1A, it will be appreciated that the RAN 104 and/or the CN 106 may be in direct or indirect communication with other RANs that employ the same RAT as the RAN 104 or a different RAT. For example, in addition to being connected to the RAN 104, which may be utilizing a NR radio technology, the CN 106 may also be in communication with another RAN (not shown) employing a GSM, UMTS, CDMA 2000, WiMAX, E-UTRA, or WiFi radio technology.

The CN 106 may also serve as a gateway for the WTRUs 102a, 102b, 102c, 102d to access the PSTN 108, the Internet 110, and/or the other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and/or the internet protocol (IP) in the TCP/IP internet protocol suite. The networks 112 may include wired and/or wireless communications networks owned and/or operated by other service providers. For example, the networks 112 may include another CN connected to one or more RANs, which may employ the same RAT as the RAN 104 or a different RAT.

Some or all of the WTRUs 102a, 102b, 102c, 102d in the communications system 100 may include multi-mode capabilities (e.g., the WTRUs 102a, 102b, 102c, 102d may include multiple transceivers for communicating with different wireless networks over different wireless links). For example, the WTRU 102c shown in FIG. 1A may be configured to communicate with the base station 114a, which may employ a cellular-based radio technology, and with the base station 114b, which may employ an IEEE 802 radio technology.

Figure 1B:
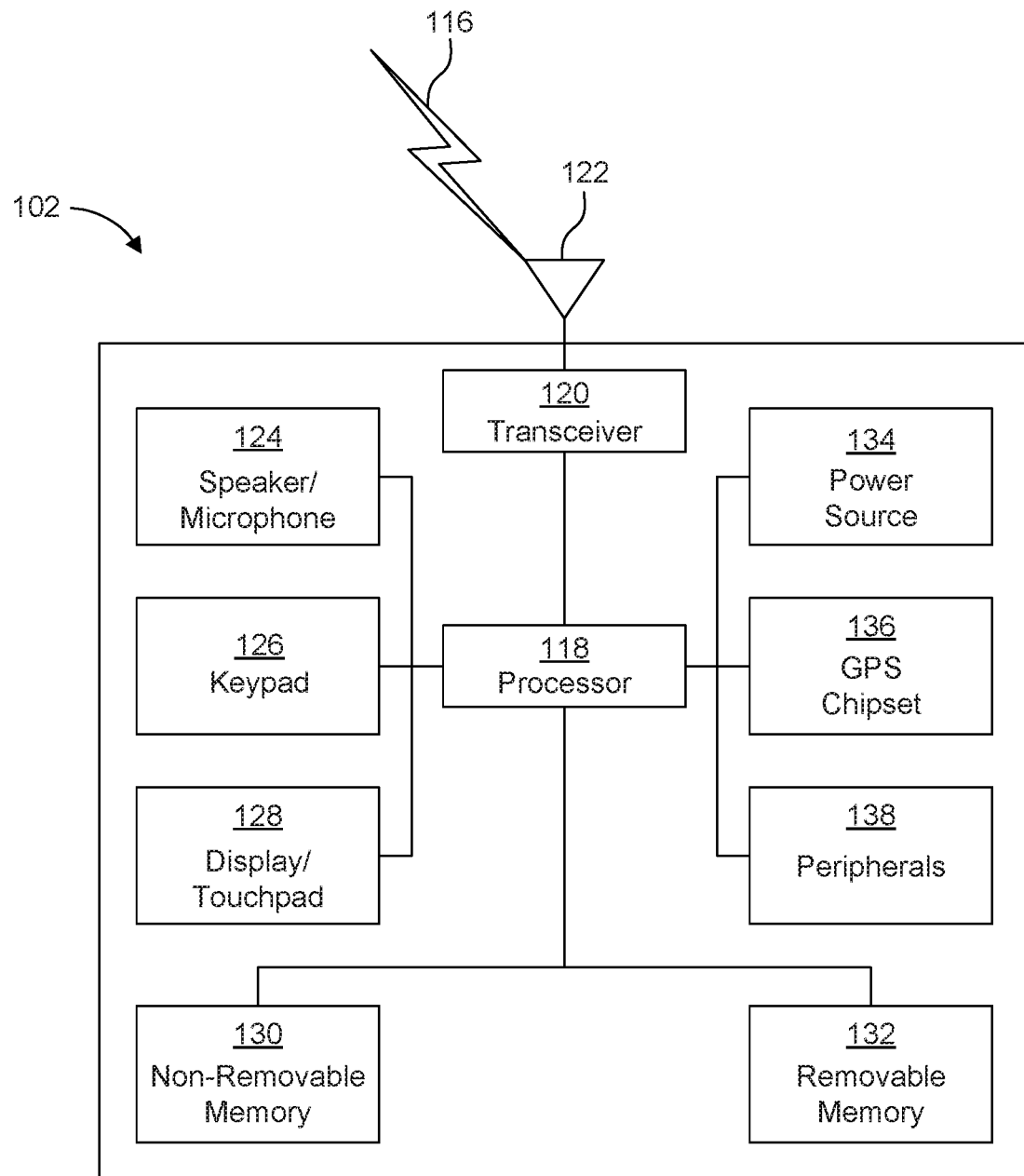
FIG. 1B is a system diagram illustrating an example wireless transmit/receive unit (WTRU) that may be used within the communications system illustrated in FIG. 1A according to an embodiment.

FIG. 1B is a system diagram illustrating an example WTRU 102. As shown in FIG. 1B, the WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and/or other peripherals 138, among others. It will be appreciated that the WTRU 102 may include any sub-combination of the foregoing elements while remaining consistent with an embodiment.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs), any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114a) over the air interface 116. For example, in one embodiment, the transmit/receive element 122 may be an antenna configured to transmit and/or receive RF signals. In an embodiment, the transmit/receive element 122 may be an emitter/detector configured to transmit and/or receive IR, UV, or visible light signals, for example. In yet another embodiment, the transmit/receive element 122 may be configured to transmit and/or receive both RF and light signals. It will be appreciated that the transmit/receive element 122 may be configured to transmit and/or receive any combination of wireless signals.

Although the transmit/receive element 122 is depicted in FIG. 1B as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as NR and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 116 from a base station (e.g., base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs and/or video), a universal serial bus (USB) port, a vibration device, a television transceiver, a hands free headset, a Bluetooth© module, a frequency modulated (FM) radio unit, a digital music player, a media player, a video game player module, an Internet browser, a Virtual Reality and/or Augmented Reality (VR/AR) device, an activity tracker, and the like. The peripherals 138 may include one or more sensors. The sensors may be one or more of a gyroscope, an accelerometer, a hall effect sensor, a magnetometer, an orientation sensor, a proximity sensor, a temperature sensor, a time sensor; a geolocation sensor, an altimeter, a light sensor, a touch sensor, a magnetometer, a barometer, a gesture sensor, a biometric sensor, a humidity sensor and the like.

The WTRU 102 may include a full duplex radio for which transmission and reception of some or all of the signals (e.g., associated with particular subframes for both the UL (e.g., for transmission) and DL (e.g., for reception) may be concurrent and/or simultaneous. The full duplex radio may include an interference management unit to reduce and or substantially eliminate self-interference via either hardware (e.g., a choke) or signal processing via a processor (e.g., a separate processor (not shown) or via processor 118). In an embodiment, the WTRU 102 may include a half-duplex radio for which transmission and reception of some or all of the signals (e.g., associated with particular subframes for either the UL (e.g., for transmission) or the DL (e.g., for reception)).

Figure 1C:
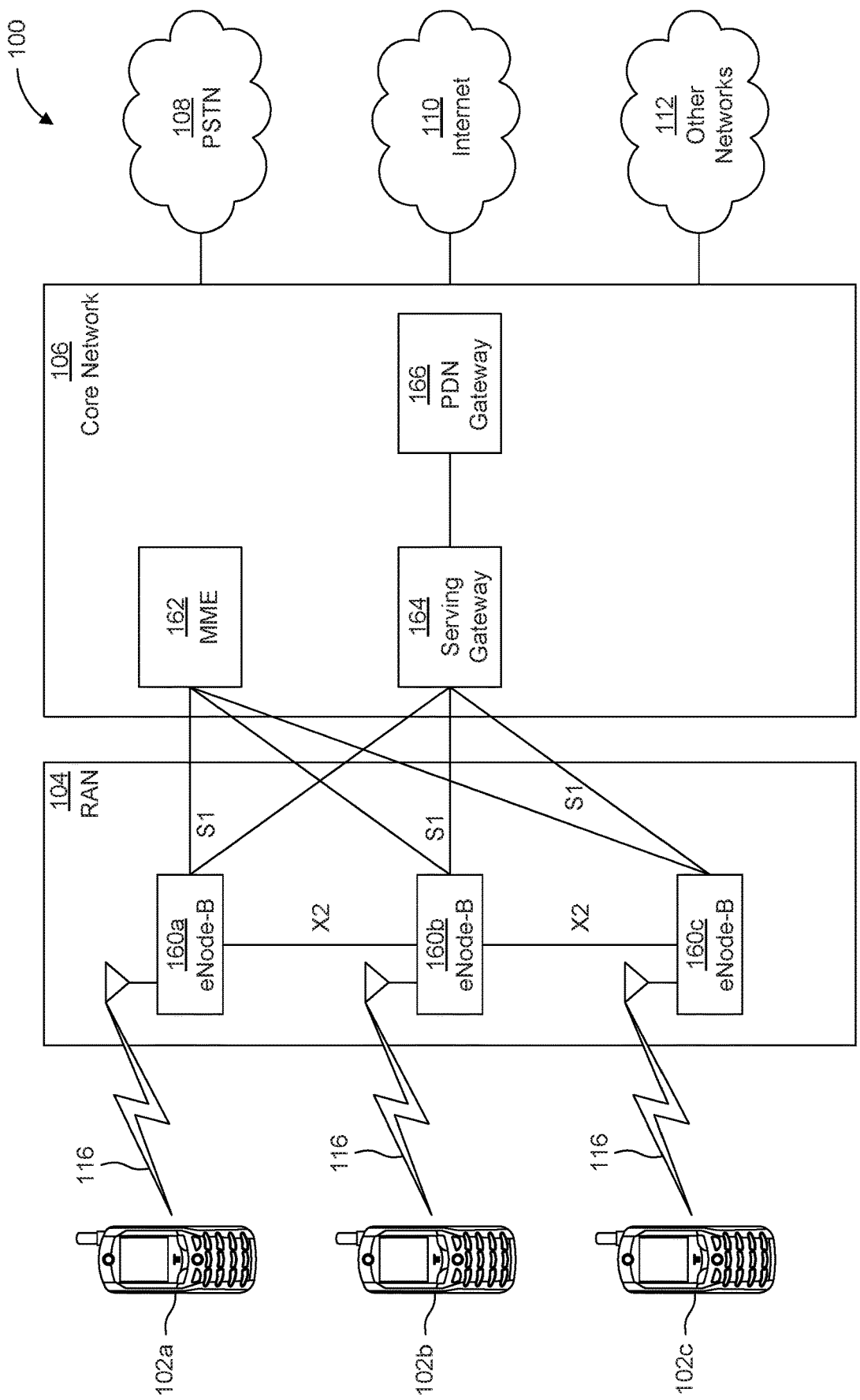
FIG. 1C is a system diagram illustrating an example radio access network (RAN) and an example core network (CN) that may be used within the communications system illustrated in FIG. 1A according to an embodiment.

FIG. 1C is a system diagram illustrating the RAN 104 and the CN 106 according to an embodiment. As noted above, the RAN 104 may employ an E-UTRA radio technology to communicate with the WTRUs 102a, 102b, 102c over the air interface 116. The RAN 104 may also be in communication with the CN 106.

The RAN 104 may include eNode-Bs 160a, 160b, 160c, though it will be appreciated that the RAN 104 may include any number of eNode-Bs while remaining consistent with an embodiment. The eNode-Bs 160a, 160b, 160c may each include one or more transceivers for communicating with the WTRUs 102a, 102b, 102c over the air interface 116. In one embodiment, the eNode-Bs 160a, 160b, 160c may implement MIMO technology. Thus, the eNode-B 160a, for example, may use multiple antennas to transmit wireless signals to, and/or receive wireless signals from, the WTRU 102a.

Each of the eNode-Bs 160a, 160b, 160c may be associated with a particular cell (not shown) and may be configured to handle radio resource management decisions, handover decisions, scheduling of users in the UL and/or DL, and the like. As shown in FIG. 1C, the eNode-Bs 160a, 160b, 160c may communicate with one another over an X2 interface.

The CN 106 shown in FIG. 1C may include a mobility management entity (MME) 162, a serving gateway (SGW) 164, and a packet data network (PDN) gateway (PGW) 166. While the foregoing elements are depicted as part of the CN 106, it will be appreciated that any of these elements may be owned and/or operated by an entity other than the CN operator.

The MME 162 may be connected to each of the eNode-Bs 162a, 162b, 162c in the RAN 104 via an S1 interface and may serve as a control node. For example, the MME 162 may be responsible for authenticating users of the WTRUs 102a, 102b, 102c, bearer activation/deactivation, selecting a particular serving gateway during an initial attach of the WTRUs 102a, 102b, 102c, and the like. The MME 162 may provide a control plane function for switching between the RAN 104 and other RANs (not shown) that employ other radio technologies, such as GSM and/or WCDMA.

The SGW 164 may be connected to each of the eNode Bs 160a, 160b, 160c in the RAN 104 via the S1 interface. The SGW 164 may generally route and forward user data packets to/from the WTRUs 102a, 102b, 102c. The SGW 164 may perform other functions, such as anchoring user planes during inter-eNode B handovers, triggering paging when DL data is available for the WTRUs 102a, 102b, 102c, managing and storing contexts of the WTRUs 102a, 102b, 102c, and the like.

The SGW 164 may be connected to the PGW 166, which may provide the WTRUs 102a, 102b, 102c with access to packet-switched networks, such as the Internet 110, to facilitate communications between the WTRUs 102a, 102b, 102c and IP-enabled devices.

The CN 106 may facilitate communications with other networks. For example, the CN 106 may provide the WTRUs 102a, 102b, 102c with access to circuit-switched networks, such as the PSTN 108, to facilitate communications between the WTRUs 102a, 102b, 102c and traditional land-line communications devices. For example, the CN 106 may include, or may communicate with, an IP gateway (e.g., an IP multimedia subsystem (IMS) server) that serves as an interface between the CN 106 and the PSTN 108. In addition, the CN 106 may provide the WTRUs 102a, 102b, 102c with access to the other networks 112, which may include other wired and/or wireless networks that are owned and/or operated by other service providers.

Although the WTRU is described in FIGS. 1A-1D as a wireless terminal, it is contemplated that in certain representative embodiments that such a terminal may use (e.g., temporarily or permanently) wired communication interfaces with the communication network.

In representative embodiments, the other network 112 may be a WLAN.

A WLAN in Infrastructure Basic Service Set (BSS) mode may have an Access Point (AP) for the BSS and one or more stations (STAs) associated with the AP. The AP may have access or an interface to a Distribution System (DS) or another type of wired/wireless network that carries traffic in to and/or out of the BSS. Traffic to STAs that originates from outside the BSS may arrive through the AP and may be delivered to the STAs. Traffic originating from STAs to destinations outside the BSS may be sent to the AP to be delivered to respective destinations. Traffic between STAs within the BSS may be sent through the AP, for example, where the source STA may send traffic to the AP and the AP may deliver the traffic to the destination STA. The traffic between STAs within a BSS may be considered and/or referred to as peer-to-peer traffic. The peer-to-peer traffic may be sent between (e.g., directly between) the source and destination STAs with a direct link setup (DLS). In certain representative embodiments, the DLS may use an 802.11e DLS or an 802.11z tunneled DLS (TDLS). A WLAN using an Independent BSS (IBSS) mode may not have an AP, and the STAs (e.g., all of the STAs) within or using the IBSS may communicate directly with each other. The IBSS mode of communication may sometimes be referred to herein as an "ad-hoc" mode of communication.

When using the 802.11ac infrastructure mode of operation or a similar mode of operations, the AP may transmit a beacon on a fixed channel, such as a primary channel. The primary channel may be a fixed width (e.g., 20 MHz wide bandwidth) or a dynamically set width. The primary channel may be the operating channel of the BSS and may be used by the STAs to establish a connection with the AP. In certain representative embodiments, Carrier Sense Multiple Access with Collision Avoidance (CSMA/CA) may be implemented, for example in 802.11 systems. For CSMA/CA, the STAs (e.g., every STA), including the AP, may sense the primary channel. If the primary channel is sensed/detected and/or determined to be busy by a particular STA, the particular STA may back off. One STA (e.g., only one station) may transmit at any given time in a given BSS.

High Throughput (HT) STAs may use a 40 MHz wide channel for communication, for example, via a combination of the primary 20 MHz channel with an adjacent or nonadjacent 20 MHz channel to form a 40 MHz wide channel.

Very High Throughput (VHT) STAs may support 20 MHz, 40 MHz, 80 MHz, and/or 160 MHz wide channels. The 40 MHz, and/or 80 MHz, channels may be formed by combining contiguous 20 MHz channels. A 160 MHz channel may be formed by combining 8 contiguous 20 MHz channels, or by combining two non-contiguous 80 MHz channels, which may be referred to as an 80+80 configuration. For the 80+80 configuration, the data, after channel encoding, may be passed through a segment parser that may divide the data into two streams. Inverse Fast Fourier Transform (IFFT) processing, and time domain processing, may be done on each stream separately. The streams may be mapped on to the two 80 MHz channels, and the data may be transmitted by a transmitting STA. At the receiver of the receiving STA, the above described operation for the 80+80 configuration may be reversed, and the combined data may be sent to the Medium Access Control (MAC).

Sub 1 GHz modes of operation are supported by 802.11af and 802.11ah. The channel operating bandwidths, and carriers, are reduced in 802.11af and 802.11ah relative to those used in 802.11n, and 802.11ac. 802.11af supports 5 MHz, 10 MHz, and 20 MHz bandwidths in the TV White Space (TVWS) spectrum, and 802.11ah supports 1 MHz, 2 MHz, 4 MHz, 8 MHz, and 16 MHz bandwidths using non-TVWS spectrum. According to a representative embodiment, 802.11ah may support Meter Type Control/Machine-Type Communications (MTC), such as MTC devices in a macro coverage area. MTC devices may have certain capabilities, for example, limited capabilities including support for (e.g., only support for) certain and/or limited bandwidths. The MTC devices may include a battery with a battery life above a threshold (e.g., to maintain a very long battery life).

WLAN systems, which may support multiple channels, and channel bandwidths, such as 802.11n, 802.11ac, 802.11af, and 802.11ah, include a channel which may be designated as the primary channel. The primary channel may have a bandwidth equal to the largest common operating bandwidth supported by all STAs in the BSS. The bandwidth of the primary channel may be set and/or limited by a STA, from among all STAs in operating in a BSS, which supports the smallest bandwidth operating mode. In the example of 802.11ah, the primary channel may be 1 MHz wide for STAs (e.g., MTC type devices) that support (e.g., only support) a 1 MHz mode, even if the AP, and other STAs in the BSS support 2 MHz, 4 MHz, 8 MHz, 16 MHz, and/or other channel bandwidth operating modes. Carrier sensing and/or Network Allocation Vector (NAV) settings may depend on the status of the primary channel. If the primary channel is busy, for example, due to a STA (which supports only a 1 MHz operating mode) transmitting to the AP, all available frequency bands may be considered busy even though a majority of the available frequency bands remains idle.

In the United States, the available frequency bands, which may be used by 802.11ah, are from 902 MHz to 928 MHz. In Korea, the available frequency bands are from 917.5 MHz to 923.5 MHz. In Japan, the available frequency bands are from 916.5 MHz to 927.5 MHz. The total bandwidth available for 802.11ah is 6 MHz to 26 MHz depending on the country code.

Figure 1D:
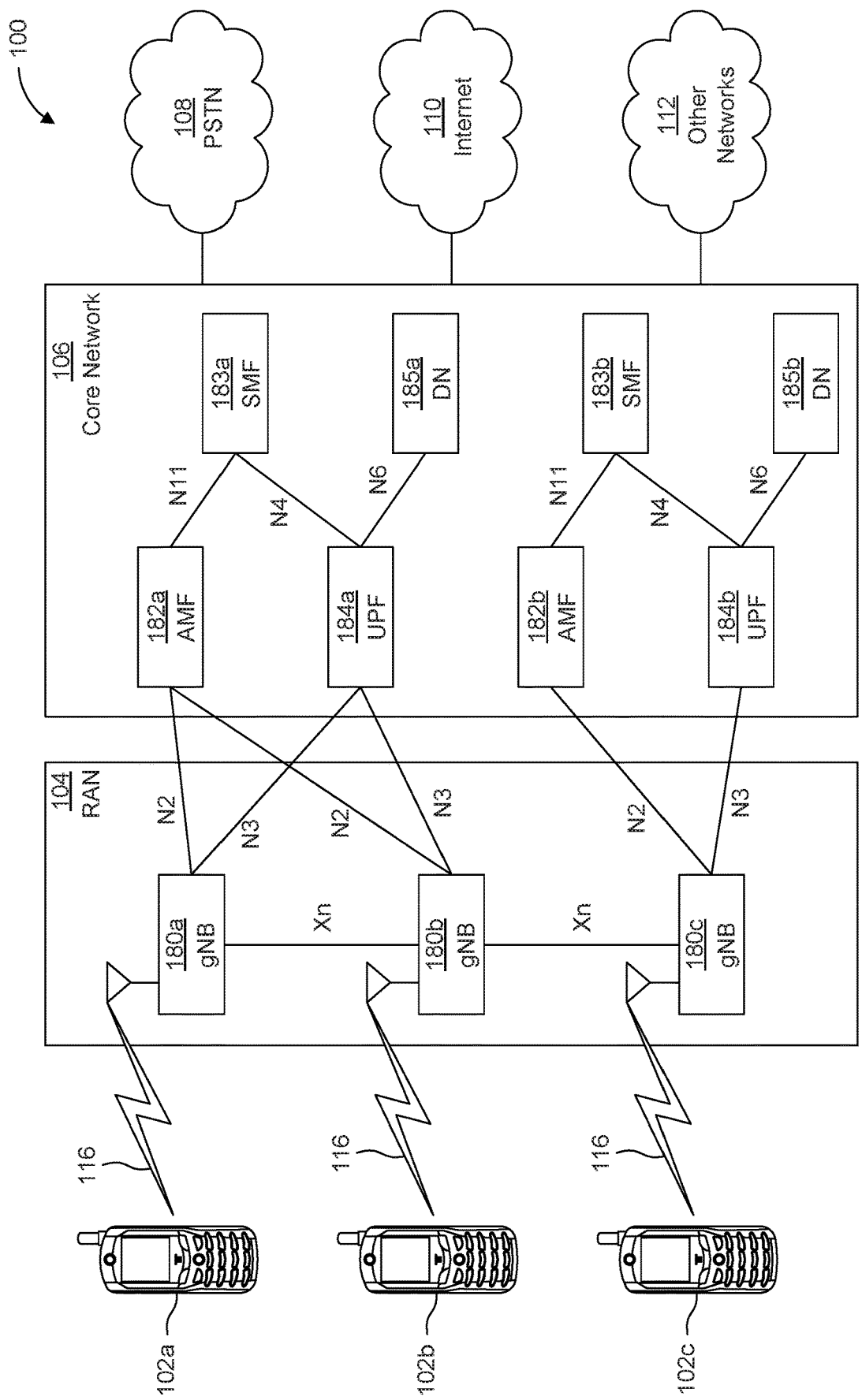
FIG. 1D is a system diagram illustrating a further example RAN and a further example CN that may be used within the communications system illustrated in FIG. 1A according to an embodiment.

FIG. 1D is a system diagram illustrating the RAN 104 and the CN 106 according to an embodiment. As noted above, the RAN 104 may employ an NR radio technology to communicate with the WTRUs 102a, 102b, 102c over the air interface 116. The RAN 104 may also be in communication with the CN 106.

The RAN 104 may include gNBs 180a, 180b, 180c, though it will be appreciated that the RAN 104 may include any number of gNBs while remaining consistent with an embodiment. The gNBs 180a, 180b, 180c may each include one or more transceivers for communicating with the WTRUs 102a, 102b, 102c over the air interface 116. In one embodiment, the gNBs 180a, 180b, 180c may implement MIMO technology. For example, gNBs 180a, 108b may utilize beamforming to transmit signals to and/or receive signals from the gNBs 180a, 180b, 180c. Thus, the gNB 180a, for example, may use multiple antennas to transmit wireless signals to, and/or receive wireless signals from, the WTRU 102a. In an embodiment, the gNBs 180a, 180b, 180c may implement carrier aggregation technology. For example, the gNB 180a may transmit multiple component carriers to the WTRU 102a (not shown). A subset of these component carriers may be on unlicensed spectrum while the remaining component carriers may be on licensed spectrum. In an embodiment, the gNBs 180a, 180b, 180c may implement Coordinated Multi-Point (CoMP) technology. For example, WTRU 102a may receive coordinated transmissions from gNB 180a and gNB 180b (and/or gNB 180c).

The WTRUs 102a, 102b, 102c may communicate with gNBs 180a, 180b, 180c using transmissions associated with a scalable numerology. For example, the OFDM symbol spacing and/or OFDM subcarrier spacing may vary for different transmissions, different cells, and/or different portions of the wireless transmission spectrum. The WTRUs 102a, 102b, 102c may communicate with gNBs 180a, 180b, 180c using subframe or transmission time intervals (TTIs) of various or scalable lengths (e.g., containing a varying number of OFDM symbols and/or lasting varying lengths of absolute time).

The gNBs 180a, 180b, 180c may be configured to communicate with the WTRUs 102a, 102b, 102c in a standalone configuration and/or a non-standalone configuration. In the standalone configuration, WTRUs 102a, 102b, 102c may communicate with gNBs 180a, 180b, 180c without also accessing other RANs (e.g., such as eNode-Bs 160a, 160b, 160c). In the standalone configuration, WTRUs 102a, 102b, 102c may utilize one or more of gNBs 180a, 180b, 180c as a mobility anchor point. In the standalone configuration, WTRUs 102a, 102b, 102c may communicate with gNBs 180a, 180b, 180c using signals in an unlicensed band. In a non-standalone configuration WTRUs 102a, 102b, 102c may communicate with/connect to gNBs 180a, 180b, 180c while also communicating with/connecting to another RAN such as eNode-Bs 160a, 160b, 160c. For example, WTRUs 102a, 102b, 102c may implement DC principles to communicate with one or more gNBs 180a, 180b, 180c and one or more eNode-Bs 160a, 160b, 160c substantially simultaneously. In the non-standalone configuration, eNode-Bs 160a, 160b, 160c may serve as a mobility anchor for WTRUs 102a, 102b, 102c and gNBs 180a, 180b, 180c may provide additional coverage and/or throughput for servicing WTRUs 102a, 102b, 102c.

Each of the gNBs 180a, 180b, 180c may be associated with a particular cell (not shown) and may be configured to handle radio resource management decisions, handover decisions, scheduling of users in the UL and/or DL, support of network slicing, DC, interworking between NR and E-UTRA, routing of user plane data towards User Plane Function (UPF) 184a, 184b, routing of control plane information towards Access and Mobility Management Function (AMF) 182a, 182b and the like. As shown in FIG. 1D, the gNBs 180a, 180b, 180c may communicate with one another over an Xn interface.

The CN 106 shown in FIG. 1D may include at least one AMF 182a, 182b, at least one UPF 184a, 184b, at least one Session Management Function (SMF) 183a, 183b, and possibly a Data Network (DN) 185a, 185b. While the foregoing elements are depicted as part of the CN 106, it will be appreciated that any of these elements may be owned and/or operated by an entity other than the CN operator.

The AMF 182a, 182b may be connected to one or more of the gNBs 180a, 180b, 180c in the RAN 104 via an N2 interface and may serve as a control node. For example, the AMF 182a, 182b may be responsible for authenticating users of the WTRUs 102a, 102b, 102c, support for network slicing (e.g., handling of different protocol data unit (PDU) sessions with different requirements), selecting a particular SMF 183a, 183b, management of the registration area, termination of non-access stratum (NAS) signaling, mobility management, and the like. Network slicing may be used by the AMF 182a, 182b in order to customize CN support for WTRUs 102a, 102b, 102c based on the types of services being utilized WTRUs 102a, 102b, 102c. For example, different network slices may be established for different use cases such as services relying on ultra-reliable low latency (URLLC) access, services relying on enhanced massive mobile broadband (eMBB) access, services for MTC access, and the like. The AMF 182a, 182b may provide a control plane function for switching between the RAN 104 and other RANs (not shown) that employ other radio technologies, such as LTE, LTE-A, LTE-A Pro, and/or non-3GPP access technologies such as WiFi.

The SMF 183a, 183b may be connected to an AMF 182a, 182b in the CN 106 via an N11 interface. The SMF 183a, 183b may also be connected to a UPF 184a, 184b in the CN 106 via an N4 interface. The SMF 183a, 183b may select and control the UPF 184a, 184b and configure the routing of traffic through the UPF 184a, 184b. The SMF 183a, 183b may perform other functions, such as managing and allocating WTRU IP address, managing PDU sessions, controlling policy enforcement and QoS, providing DL data notifications, and the like. A PDU session type may be IP-based, non-IP based, Ethernet-based, and the like.

The UPF 184a, 184b may be connected to one or more of the gNBs 180a, 180b, 180c in the RAN 104 via an N3 interface, which may provide the WTRUs 102a, 102b, 102c with access to packet-switched networks, such as the Internet 110, to facilitate communications between the WTRUs 102a, 102b, 102c and IP-enabled devices. The UPF 184, 184b may perform other functions, such as routing and forwarding packets, enforcing user plane policies, supporting multi-homed PDU sessions, handling user plane QoS, buffering DL packets, providing mobility anchoring, and the like.

The CN 106 may facilitate communications with other networks. For example, the CN 106 may include, or may communicate with, an IP gateway (e.g., an IP multimedia subsystem (IMS) server) that serves as an interface between the CN 106 and the PSTN 108. In addition, the CN 106 may provide the WTRUs 102a, 102b, 102c with access to the other networks 112, which may include other wired and/or wireless networks that are owned and/or operated by other service providers. In one embodiment, the WTRUs 102a, 102b, 102c may be connected to a local DN 185a, 185b through the UPF 184a, 184b via the N3 interface to the UPF 184a, 184b and an N6 interface between the UPF 184a, 184b and the DN 185a, 185b.

In view of FIGS. 1A-1D, and the corresponding description of FIGS. 1A-1D, one or more, or all, of the functions described herein with regard to one or more of: WTRU 102a-d, Base Station 114a-b, eNode-B 160a-c, MME 162, SGW 164, PGW 166, gNB 180a-c, AMF 182a-b, UPF 184a-b, SMF 183a-b, DN 185a-b, and/or any other device(s) described herein, may be performed by one or more emulation devices (not shown). The emulation devices may be one or more devices configured to emulate one or more, or all, of the functions described herein. For example, the emulation devices may be used to test other devices and/or to simulate network and/or WTRU functions.

The emulation devices may be designed to implement one or more tests of other devices in a lab environment and/or in an operator network environment. For example, the one or more emulation devices may perform the one or more, or all, functions while being fully or partially implemented and/or deployed as part of a wired and/or wireless communication network in order to test other devices within the communication network. The one or more emulation devices may perform the one or more, or all, functions while being temporarily implemented/deployed as part of a wired and/or wireless communication network. The emulation device may be directly coupled to another device for purposes of testing and/or performing testing using over-the-air wireless communications.

The one or more emulation devices may perform the one or more, including all, functions while not being implemented/deployed as part of a wired and/or wireless communication network. For example, the emulation devices may be utilized in a testing scenario in a testing laboratory and/or a non-deployed (e.g., testing) wired and/or wireless communication network in order to implement testing of one or more components. The one or more emulation devices may be test equipment. Direct RF coupling and/or wireless communications via RF circuitry (e.g., which may include one or more antennas) may be used by the emulation devices to transmit and/or receive data.

To enhance the reliability and robustness of the transmission, the overall transmission strategy should better leverage diversity. The notion of transmission diversity may include various aspects such as diversity in spatial and time domains. However, simple spatial and time diversity alone may not be sufficient for achieving high reliability transmission. In this disclosure, solutions for several problems related to multi-transmission systems are provided.

Figure 2:
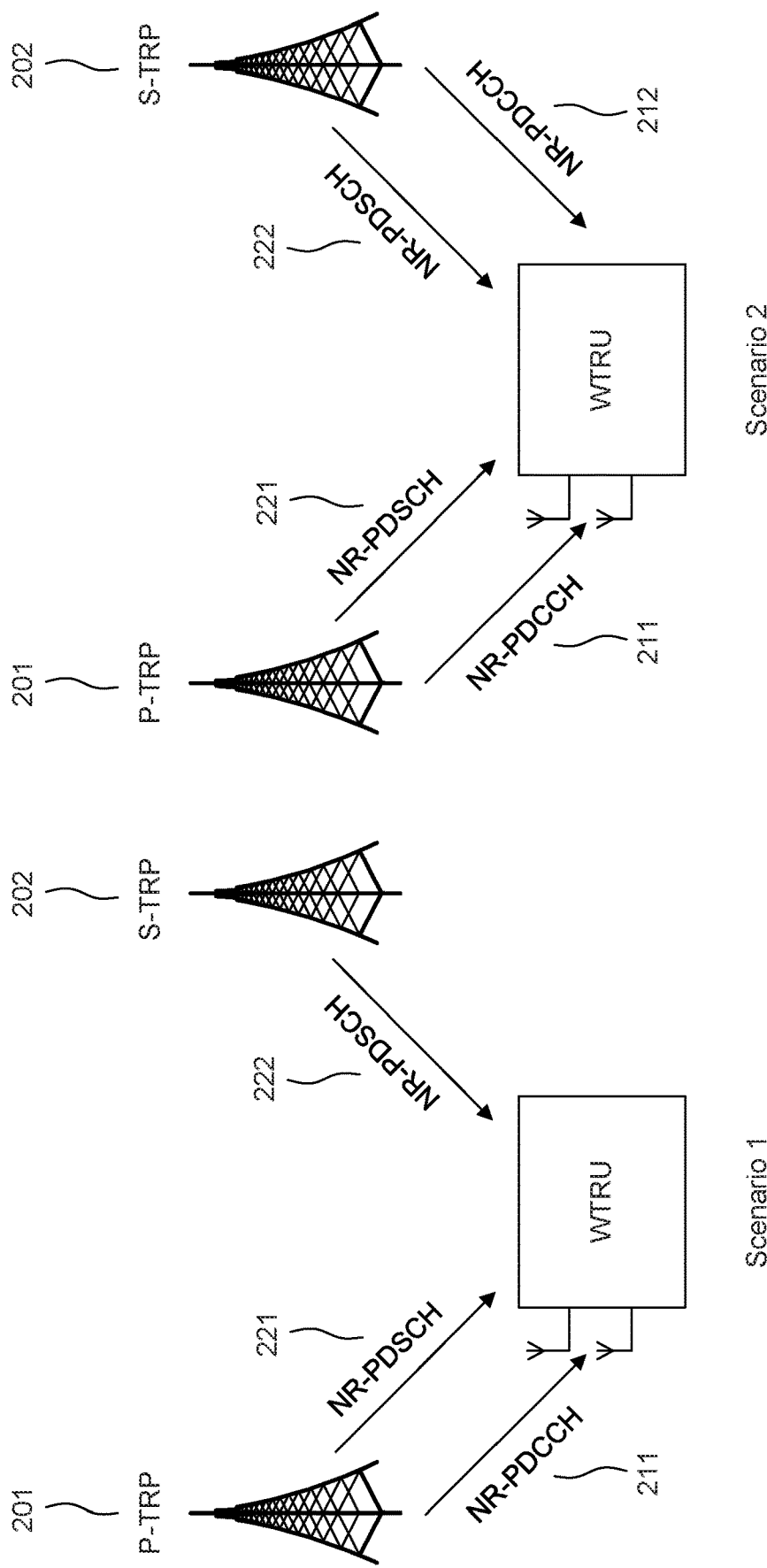
FIG. 2 is a diagram showing two exemplary scenarios for MTRP operation.

FIG. 2 provides one context for improved leveraging of transmission diversity by way of MTRP operation. Two options for downlink MTRP operation are provided. As shown in FIG. 2, P-TRP 201 and S-TRP 202 refer to primary and secondary TRPs, respectively. In the first scenario, a single NR-PDCCH 211 schedules a single NR-PDSCH transmission, which involves transmission of separate layers, or repetitions, 221 and 222 from separate TRPs 201 and 202 respectively. In the second scenario, multiple NR-PDCCHs 211 and 212 each schedule respective NR-PDSCHs 221 and 222 for which each NR-PDSCH repetition 221 and 222 is transmitted from a separate TRP 201 and 202. A wireless technology, such as NR, may support two NR-PDSCHs per component carrier basis in the case of one bandwidth part, and two NR-PDCCHs corresponding in a single slot.

Although the embodiment above is described in the context of NR wireless technologies, using physical downlink shared channels and control channels for transmission, enhancements described herein may be implemented using other types of wireless technologies and repetitions may conceivably be transmitted and/or scheduled using various other types of channels.

Enhancements to the transmission protocol may be implemented in the MTRP scheme above. The enhancement achieved by using the basic protocol based on the repetition of an already transmitted signal may be limited. Such transmission protocol may or may not consider other signal features and attributes. Enhancements to the signal design of the above MTRP scheme may also be applied to improve transmission diversity. To improve the transmission protocol, the signal design may be adjusted per additional transmission.

In the following disclosure, the term "reference symbol" may be used to denote a symbol such as a complex number that is fixed, known, and used as a pilot. "Reference signal" may be used to denote the time domain signal that is generated after processing the reference symbols. For example, in OFDM, reference symbols may be the complex numbers that are fed into the IDFT block while a reference signal may be the output of the IDFT block. "Downlink control information" (DCI) may refer to a set of bits that are transmitted over a PDCCH for a user or a group of users. "Resource element" (RE) may refer to one OFDM symbol on one subcarrier, and "resource element group" (REG) may refer to a group of REs used as building blocks of control channel element (CCE) which assign resource elements to a user. Adjacent REGs in time or frequency that are grouped together and which share an associated precoder may be called REG "bundles." Here in this disclosure, NR-REG, NR-CCE, and NR-PDCCH refer to REG, CCE, and PDCCH for the new radio (NR) in 5G. Also, here, WTRU, user equipment (UE), and user may be used interchangeably and refer to the same thing. Also, "gNodeB" and "gNB" may refer to the same thing. A "control resource set" (CORESET) may refer to a set of resource elements used for the downlink control channel, configured by its frequency resources and its length in time (in terms of symbols) and the type of its REG bundles. A "search space" (or a set of search spaces) is a set of PDCCH candidates that is monitored by a WTRU or a group of WTRUs during blind detection of PDCCH.

Hereinafter, the term "retransmission" may be interchangeably used with a "repetitive transmission," a "repetition," and "aggregated transmission." In addition, the term "retransmission number" may be interchangeably used with "retransmission index," "retransmission time," "retransmission order," and "retransmission sequence number."

Figure 3:
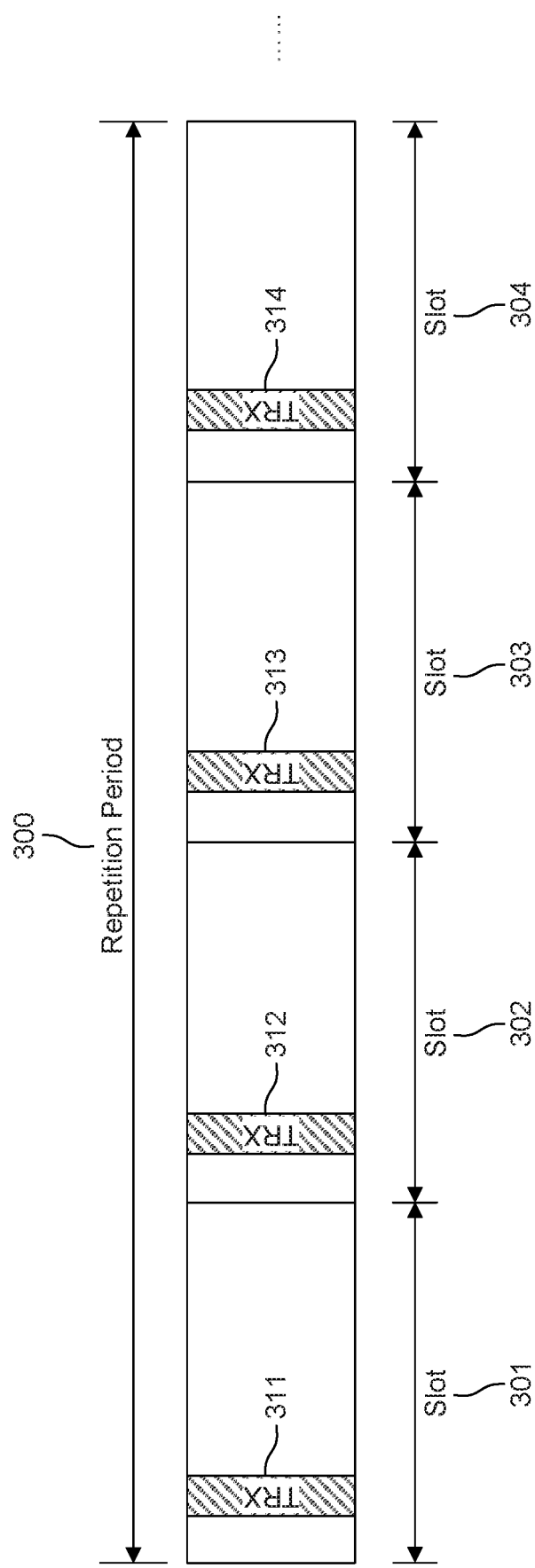
FIG. 3 shows a basic mechanism for enhancing transmission reliability involving transmitting a plurality of repetitions.

FIG. 3 shows one basic repetition mechanism to enhance transmission reliability in which each re-transmission is a replica of the first transmission using the same modulation and symbol mapping. The repetition may be implemented within a same slot or across several slots. For example, as shown, the period 300 for a single transmission may be comprised of slots 301, 302, 303, and 304. Within such slots, transmissions 312, 313, and 314 may be retransmissions, or repetitions of transmission 311. Retransmissions 312, 313, and 314 may be sent, for example, using the same timing symbol number as in slot 301 in successive slots 302, 303, and 304.

In a solution, a TRP may use multi-dimensional modulation by adopting a different constellation mapping for one or more retransmissions. A WTRU may be configured to decipher the modulated transmissions based on the constellation mappings. Thus, upon receiving transmissions that implement such a multi-dimensional modulation scheme, a WTRU may use logic similar to that required to process and modulate a data payload. For example, as is described below a WTRU may detect one or more transmission layers, determine a constellation mapping, demodulate and process a set of modulation symbols to obtain the a set of coded bit sequences. The logic used may differ depending on the scheme adopted for transmission of the data payload at the TRP side.

A constellation mapping may provide a graphical representation of a digital signal modulation scheme. In examples, the constellation mapping may be presented as a two-dimensional scatter plane, where the angle of a constellation point measured from the positive x-axis may indicate a phase shift for a modulated symbol, and a distance of the constellation point from the origin may represent another modulation variable, such as amplitude or power. A series of data bits may be mapped to constellation points that represent the modulation symbols.

Figure 4:
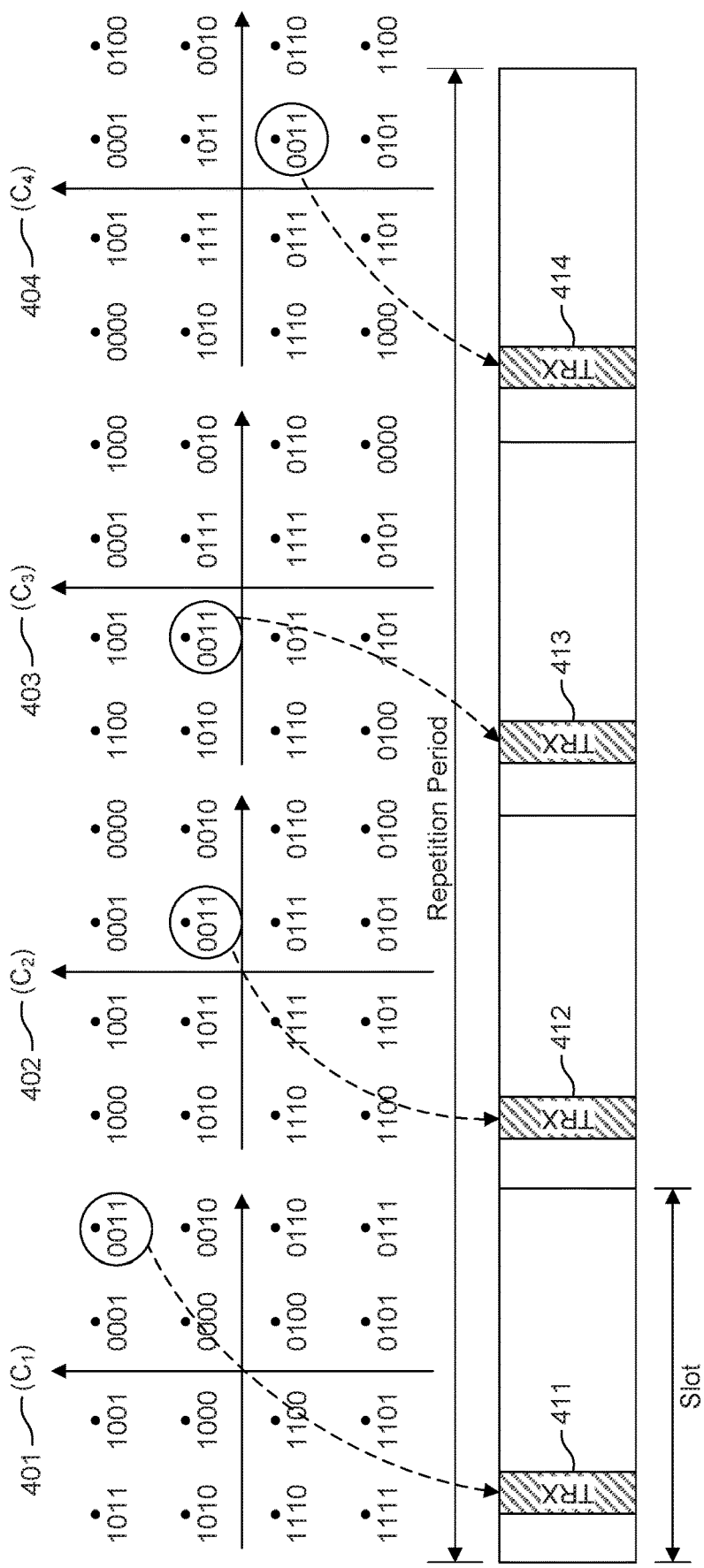
FIG. 4 shows a transmission scheme in which a modulation scheme is varied for each successive repetition.
Figure 5:
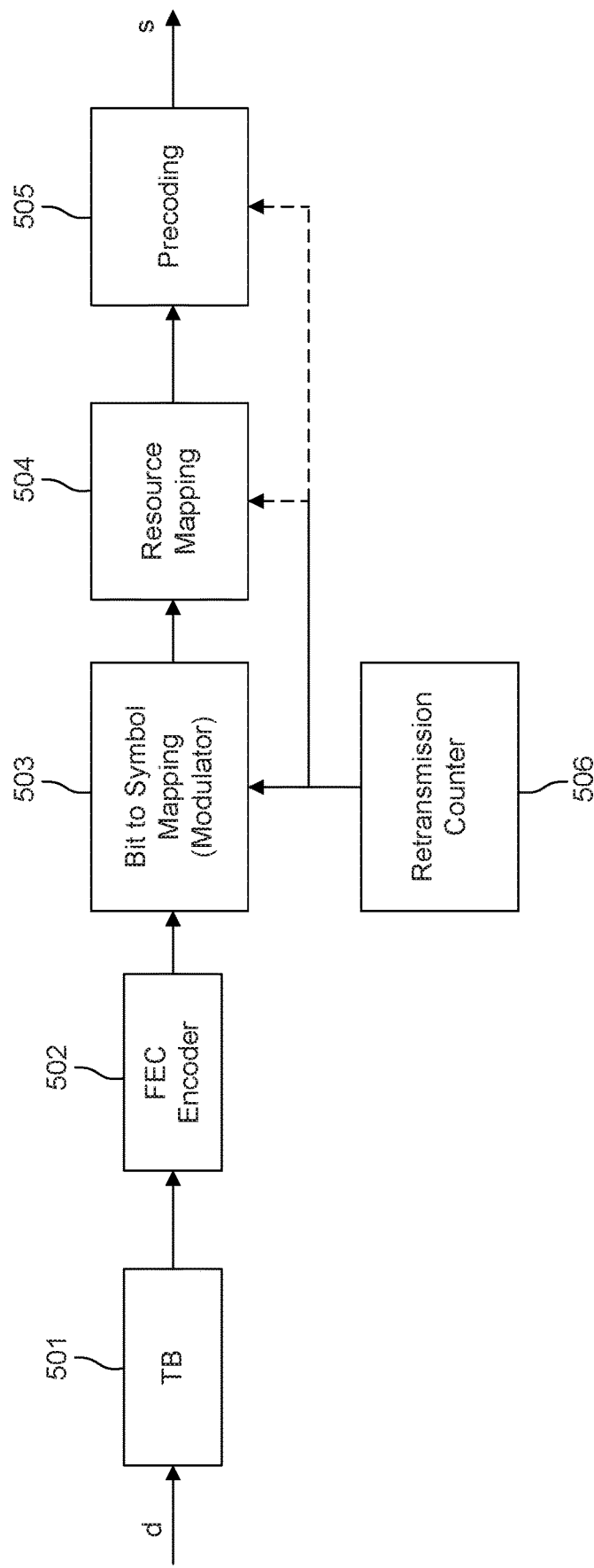
FIG. 5 is a block diagram providing an overview of transport channel processing, including the multi-dimensional modulation process provided in FIG. 4.

FIGS. 4 and 5 show an implementation of a high reliability transmission procedure in which the bit-to-symbol mapping of the modulation function is adjusted per retransmission. Specifically, FIG. 4 shows a transmission repetition mechanism in which the modulation scheme is varied according to distinct constellations 401, 402, 403, and 404. The constellation mapping for each transmission may be designed to enhance detection capability by maximizing distance metrics such as vector distance, Euclidean distance, product distance, among others, and by employing different symbol mapping approaches (Gray coding, for example). As demonstrated in FIG. 4, for an exemplary transmission of "0011" bits, different 16QAM symbols may be used to improve detection likelihood by providing additional transmission diversity. For each transmission 411, 412, 413, and 414, the position of the mapped bit sequence "0011" within each of their respective constellations 401, 402, 403, and 404 may be shifted to a point corresponding to the new symbol.

FIG. 5 provides an overview of transport channel processing, including a multi-dimensional modulation process as may be implemented in the above retransmission process. At 501, data may flow from the medium access (MAC) layer to the physical layer for transmission via transport channels. Data may be delivered to the physical layer in a transport block, for which a cyclic redundancy code may be calculated and appended. A transport block may be transformed into a single code block or segmented into a plurality of code blocks. The transport block may, at 502, undergo encoding for error correction purposes. Forward Error Correction (FEC) may be performed using various methods, including low density parity check coding or turbo coding. Bit-to-symbol mapping may take place at 503, translating the coded bits into modulation symbols for transmission. At 504 and 505, the modulated symbols may be distributed across available resources and precoded for transmission via one or more antennas.

As shown in FIG. 5, a retransmission counter 506 may increment for each successive retransmission/repetition. In embodiments where the constellation mapping is determined according to a retransmission/repetition index, for example, the constellation, and therefore the bit-to-symbol mapping described above may therefore be varied for each retransmission. In a solution, the resource mapping for each retransmission with the new symbol mapping may also be varied per repetition index. Moreover, every retransmission with a new constellation mapping may be combined with a different beam or precoder.

In some solutions, the constellation for every subsequent repetition may be based on a rotated version of the constellation mapping used for the first transmission. A WTRU may assume the applied rotation for each repetition, based on a prior configuration, or based on one or more other parameters, such as: a maximum repetition factor K, a time index, beam index, among others. In other solutions, instead of using a different constellation mapping for each subsequent transmission, the modulation symbols for subsequent transmissions may be determined using a limited number of different constellation mappings. A WTRU may also use a limited number of constellation mappings, which may, for example, avoid extra complexity.

Figure 6:
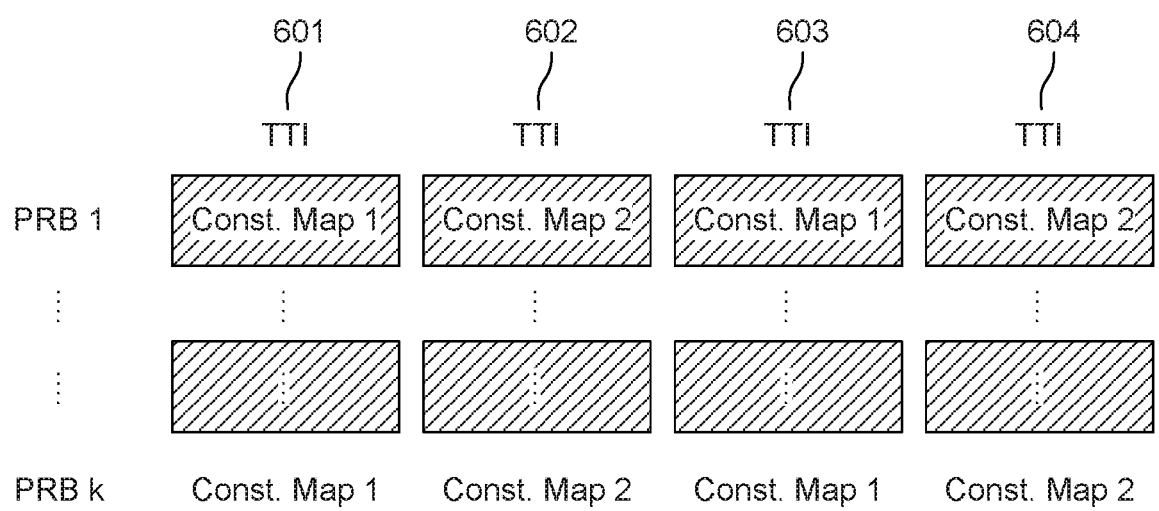
FIG. 6 shows an exemplary solution for a high reliability transmission solution based on four repetitions, where only two constellation mapping options are considered for retransmissions.

FIG. 6 shows an exemplary solution for a high reliability transmission solution based on four repetitions, where only two constellation mapping options are considered for retransmissions. As shown, repetitions may be transmitted in TTIs 601, 602, 603, and 604, and one of the two constellation mappings may be applied to each TTI in an alternating fashion. Each repetition transmitted in a given TTI may be transmitted using a different physical resource band (PRB).

A WTRU may determine the constellation mapping per retransmission based on a received semi-static or dynamic indication. For a solution in which K repetitions are to be transmitted, a WTRU may be configured with one or more options for the sequence of constellation mappings, i.e., $\{C_1, C_2, \ldots, C_K\}$, where each sequence may be indicated by an index.

Alternatively, a WTRU may determine the constellation mapping for each retransmission based on one or more parameters, such as: a time transmission index, e.g., symbol number, slot number, frame number, or transmission number, among others. For example, a WTRU may assume a baseline constellation mapping is being used on odd-numbered transmission occasions, e.g., slots, and the WTRU may also assume that a secondary constellation mapping is used for even-numbered transmission occasions. A baseline constellation mapping may be preconfigured at the WTRU or received via a semi-static or dynamic indication. A baseline constellation mapping may also be predetermined for a wireless technology, such as NR.

In a solution, a bit interleaver may be used for each retransmission, which may result in different constellation points, and therefore modulation symbols, being used for each retransmission. For example, one or more bit interleavers may be used and each bit interleaver may be identified by an index. Hereinafter, the "index" may also be referred to as an "interleaver index," "bit interleaver index," "bit mapping index," "bit scrambling sequence index," and/or "bit ordering index."

Figure 7:
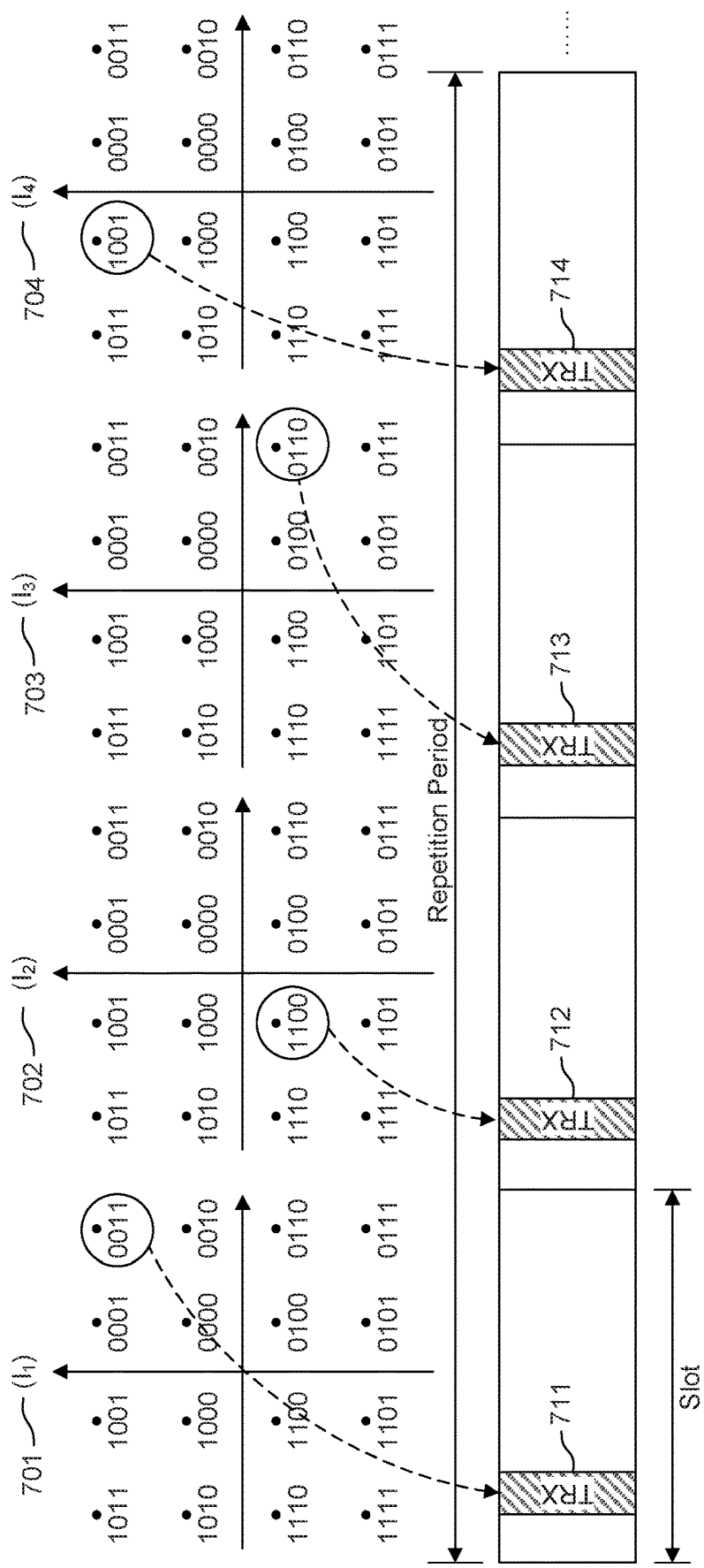
FIG. 7 shows a transmission scheme in which a bit-to-symbol mapping for a modulation function is varied for each successive repetition.
Figure 8:
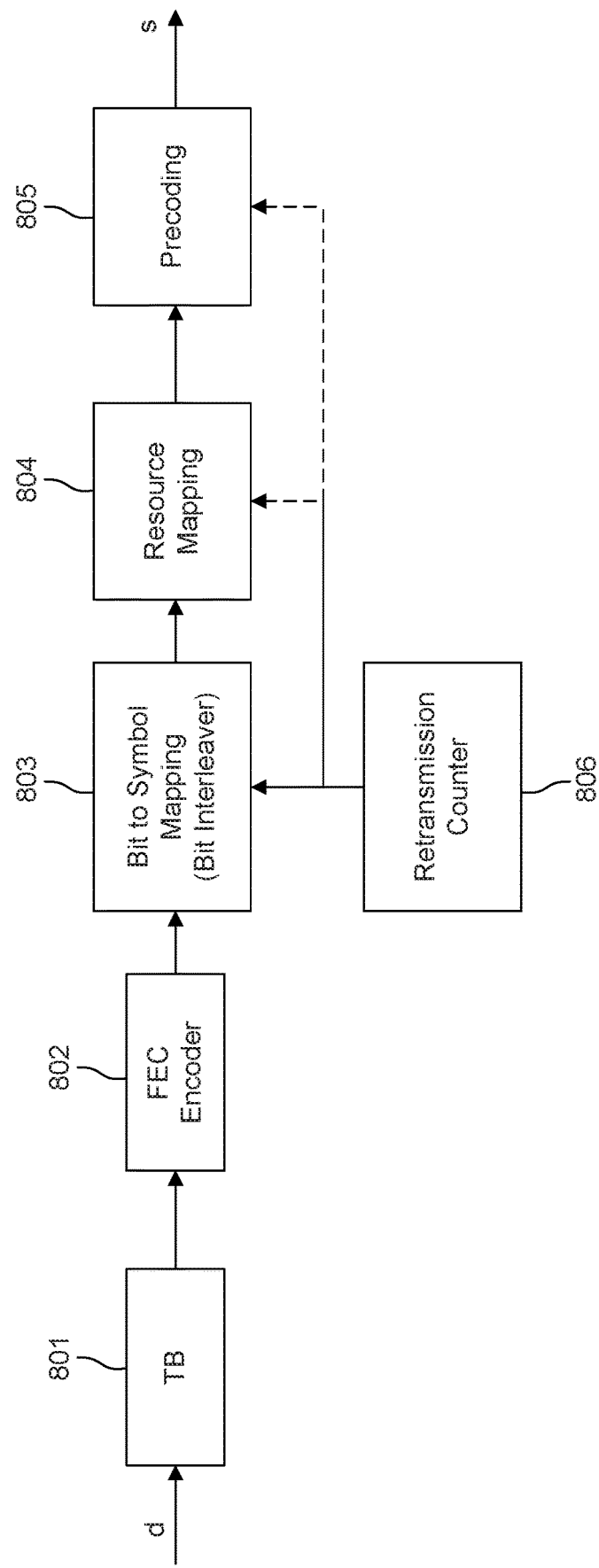
FIG. 8 is a block diagram providing an overview of transport channel processing, including the multi-dimensional modulation process provided in FIG. 7.

FIGS. 7 and 8 show an implementation of a high reliability transmission procedure in which the bit-to-symbol mapping of the modulation function is adjusted per retransmission. Specifically, FIG. 7 shows a transmission repetition mechanism in which the modulation scheme is varied by applying an interleaver to coded bit sequences before mapping the interleaved bit sequences to existing constellations 701, 702, 703, and 704. Thus, for each transmission 711, 712, 713, and 714, the position of the interleaved bit sequence within each of the constellations 701, 702, 703, and 704 may be shifted to a point corresponding to the new symbol.

Similar to FIG. 6, FIG. 8 provides a basic overview of transport channel processing, including multi-dimensional modulation as may be implemented in the above retransmission process. Transport channel processing may proceed in a substantially similar fashion as described for FIG. 6. At 801, data may flow from the medium access (MAC) layer to the physical layer for transmission via transport channels. The transport block may, at 802, undergo FEC encoding for error correction purposes. Bit-to-symbol mapping may take place at 803, translating the coded bits into modulation symbols for transmission. As described above, during the bit-to-symbol mapping, the interleaver may be used to vary the modulation symbols to be transmitted in successive repetitions. In embodiments, this may be performed instead of using distinct constellations for transmission, or it may be performed in addition to generating distinct constellations. At 804 and 805, the modulated symbols may be distributed across available resources and precoded for transmission via one or more antennas.

In some cases, a bit interleaver index for a downlink transmission may be determined based on a retransmission or repetition number. For example, a first bit interleaver may be used for a first retransmission, a second bit interleaver may be used for a second retransmission, and so on.

A bit interleaver size may be same as the number of bits used for a modulation symbol. The number of bits used for a modulation symbol may depend upon the order of the modulation scheme, For instance, four bits may be used to represent symbols in a 16 QAM scheme. Thus, if a modulation order used for a downlink transmission is 16 QAM, a four bit interleaver may be used, and the bit interleaver may be used for every bit sequence that is formed for a modulation symbol.

The bit interleaver may perform a variety of transformations to a bit sequence or group to form a modulation symbol, such as cyclic shifting, mirroring, or bit reversing. In an example assuming a 16QAM scheme, if a series of bits, denoted as $[c_n, c_{n+1}, c_{n+2}, c_{n+3}]$, is grouped for a modulation symbol with 16QAM, a bit interleaver may change the order of the bit sequence such that a resulting bit sequence is $[c_{n+1}, c_{n+2}, c_{n+3}, c_n]$ for cyclic shift or $[c_{n+3}, c_{n+2}, C_{n+1}, c_n]$ for a mirroring transformation.

A bit interleaver index for a downlink transmission may be determined based on a TRP index, which may be associated with a downlink transmission. The TRP index may be determined or indicated by an associated channel state information reference signal (CSI-RS) and/or synchronization signal block (SSB) that is quasi-collocated (QCL-ed) with a demodulation reference signal (DMRS) for the channel (e.g., a PDSCH).

A bit interleaver index for a downlink transmission may be determined based on one or more system parameters that include, but are not limited to a slot number, subframe number, orthogonal frequency division multiplexing (OFDM) symbol number, bandwidth part (BWP) index, carrier index, or a resource block index.

In an embodiment, the use of a bit interleaver based on the retransmission number may be determined based on the modulation order. For example, if the modulation order is equal to or less than a threshold (e.g., QPSK), the same bit interleaving scheme may be used for all retransmissions. In other scenarios, such as where the modulation order is greater than a threshold, the bit interleaving scheme may vary according to a transmission index, for example. The threshold may be determined based on the number of retransmissions (or repetitions) for a single PDSCH transmission (e.g., without HARQ retransmissions).

In another solution, a two-step interleaver may be used for each retransmission. For example, a first interleaver may be used for each of the bit sequences grouped to form a modulation symbol, and a second interleaver may be used for the modulated symbols. The first interleaver may be referred to as a "bit-level" interleaver and the second interleaver may be referred to as a "symbol-level" interleaver. One or more of following rules may apply. The operation of a first interleaver may be determined based on a retransmission number while the operation of a second interleaver may be determined based on a HARQ retransmission number, wherein a retransmission number may be a repetition number of a single DL transmission.

In another solution, a bit reverse operation may be used for each retransmission, which may change the modulation symbol to which the bit is mapped via the constellation. For example, a bit sequence [1 1 1 1] may be transmitted in a first retransmission, and the bit sequence may be reversed to [0 0 0 0] in a second transmission. Further bit reverse operations may be applied to subsequent retransmissions. The bit reverse operation may be used, for example, when the modulation order is equal to or less than a threshold (e.g., QPSK) or vice versa.

In another solution, a scrambling sequence may be determined based on the HARQ retransmission number, wherein one or more scrambling sequences may be used. A scrambling sequence initialization (e.g., $C_{init}$) may be based on the retransmission number. The scrambling sequence may be used for the coded bits before the symbol mapping.

Disclosed herein are embodiments incorporating the multi-dimensional modulation schemes above in systems for multi-TRP transmission. In such embodiments, each repetition of a downlink transmission may be transmitted by a separate TRP. As is shown in FIG. 3 and previously described in paragraphs above, each repetition 311, 312, 313, and 314 may be transmitted within slots 301, 302, 303, and 304 by separate TRPs. Alternatively, a limited number of TRPs may be used to transmit a series of repetitions. Each TRP may transmit multiple repetitions. For instance, TRPs may transmit repetitions in an alternating fashion, or one TRP may potentially transmit consecutive repetitions before another TRP transmits a subsequent repetition or repetitions. In solutions, multi-dimensional modulation may be applied to multi-TRP transmissions, and the constellation mapping may be varied per TRP. In a solution, the constellation for every repetition may be based on a rotated version of the constellation mapping used for the first TRP. A WTRU may assume the applied rotation for each TRP, based on a prior configuration, or based on one or more other parameters, such as: the maximum number of TRPs, a time index, or number of beams, among others. A per-TRP constellation mapping definition may be implemented using orthogonal or non-orthogonal resources.

Figure 9:
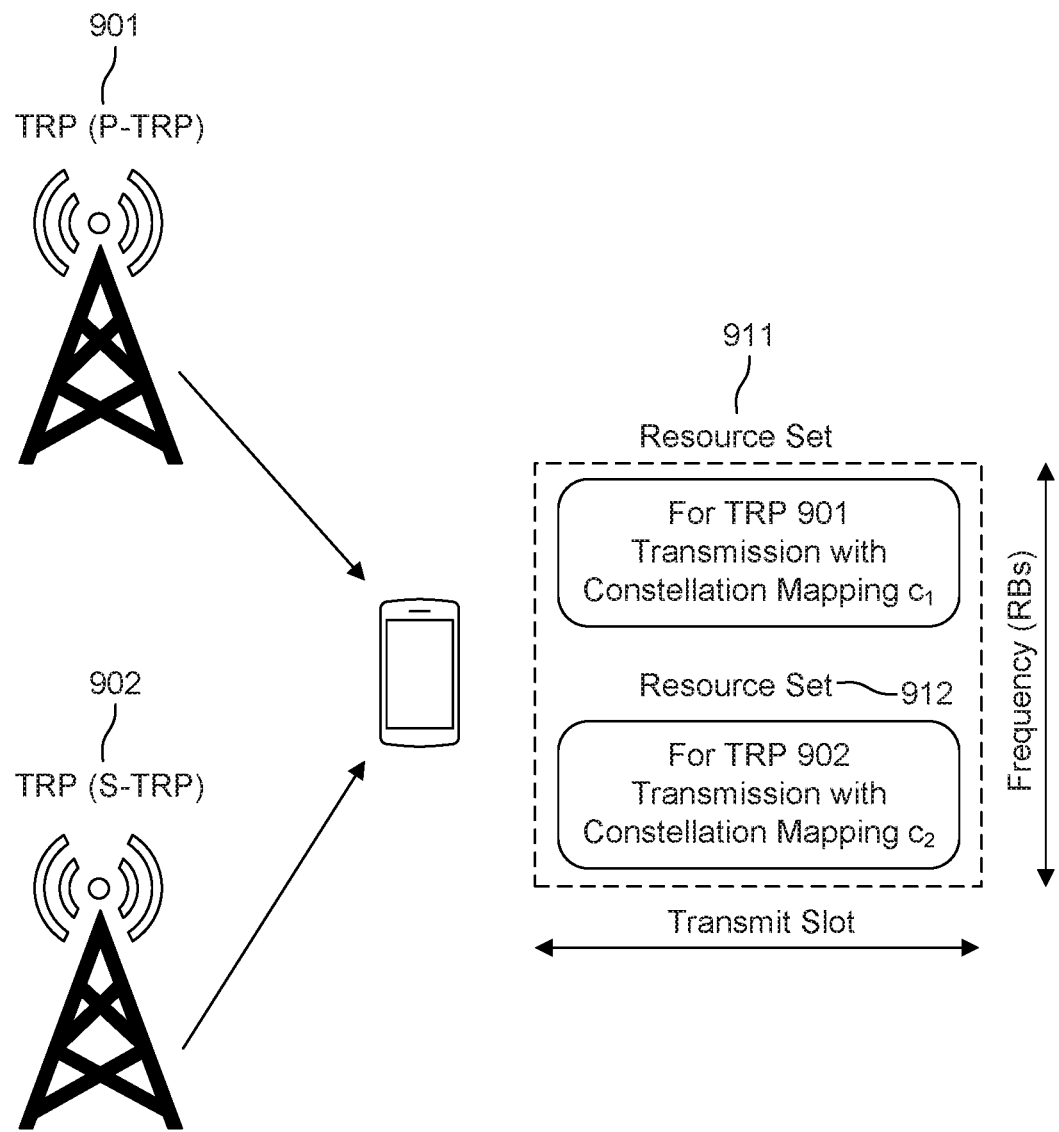
FIG. 9 shows an exemplary multi-TRP transmission scheme involving two TRPs and using multi-dimensional modulation where orthogonal resource sets are used by each TRP.

FIG. 9 shows an exemplary multi-TRP transmission scheme involving two TRPs and using multi-dimensional modulation where orthogonal resource sets are used by each TRP. TRP 901 may be a primary TRP (P-TRP) and TRP 902 may be a secondary TRP (S-TRP). TRPs 901 and 902 may transmit separate repetitions of a downlink transmission to a WTRU 903 using separate resource sets 911 and 912. The first resource set 911 and the second resource set 912 may be composed of a same number of REs; however, they may span different time intervals and/or frequencies. In a solution, the orthogonal resources may be mapped on different bandwidth parts, and the bandwidth parts may each have a different numerology. In a solution, a WTRU may determine the constellation mappings used for each TRP transmission explicitly or implicitly from a DCI.

Alternatively, based on a received semi-static configuration, a WTRU may assume a predefined constellation mapping for each TRP. A WTRU may receive and demodulate the transmitted payload mapped on each resource set independently. A WTRU may detect the received symbols mapped on either one of the resource sets, or concurrently detect the payloads transmitted via separate TRPs using both resource sets 1 and 2.

Figure 10:
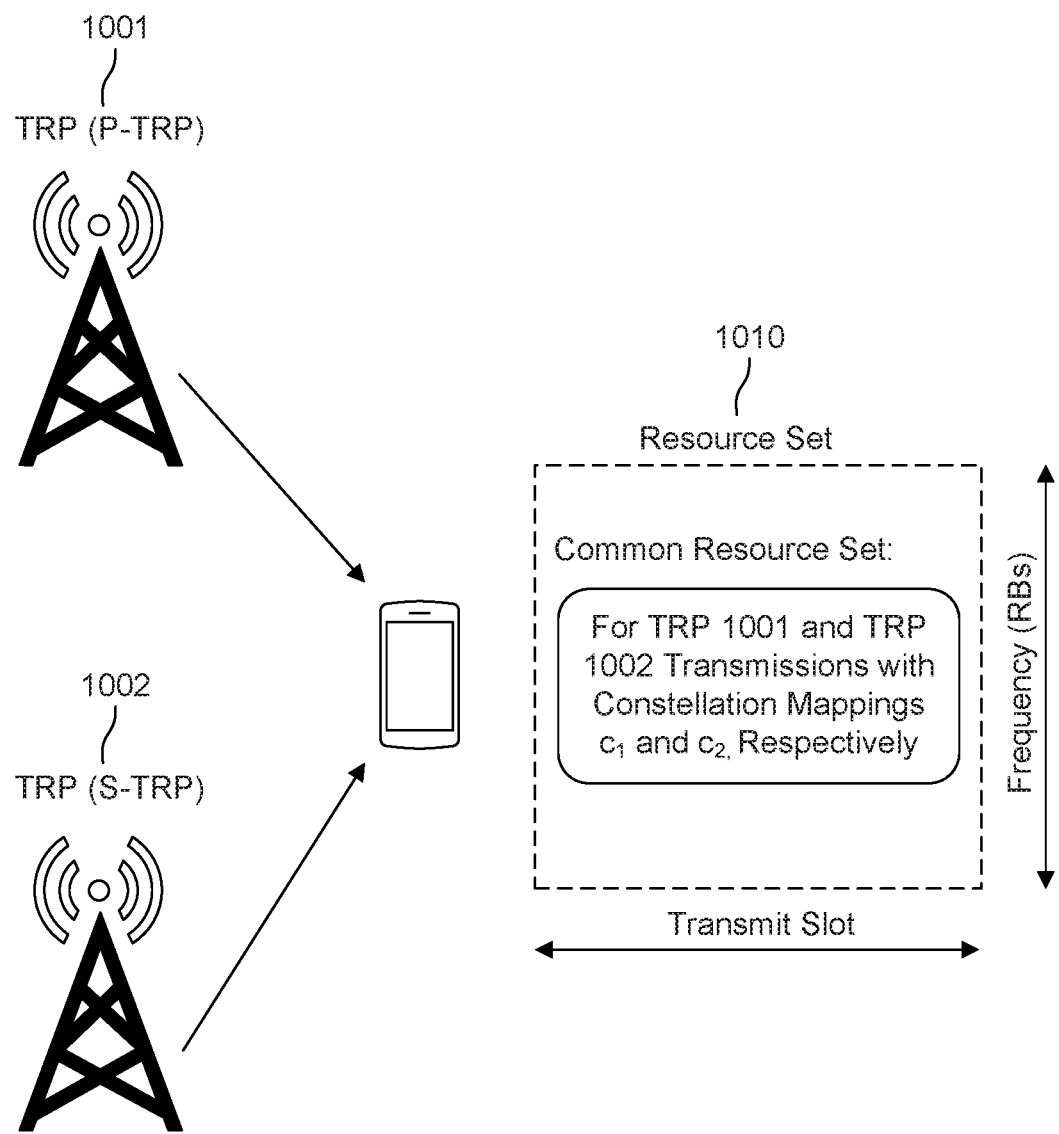
FIG. 10 shows an exemplary multi-TRP transmission scheme involving two TRPs using multi-dimensional modulation, where a same set of resources is used by the TRPs.

FIG. 10 shows an exemplary multi-TRP transmission scheme involving two TRPs 1001 and 1002 using multi-dimensional modulation, where a same set of resources, 1010, is used by the TRPs. In a solution, a WTRU may determine the constellation mapping used for each TRP transmission explicitly or implicitly from a DCI. Alternatively, based on a received semi-static configuration, a WTRU may assume a predefined constellation mapping for each TRP.

A WTRU may use a two-step procedure for detection of the transmitted payload. A WTRU may first use spatial demodulation, i.e., MIMO detection, to estimate the mapped symbols transmitted by each TRP. Second, relying on the demodulated symbols, a WTRU may detect the transmitted payload by concurrently processing the symbols.

In an alternative solution, a WTRU may use only a single-step process for detection of a transmitted payload if the constellation mappings used by TRPs are such that, for all or most of the bit groups mapped to a symbol, the combination of received signals based on constellations $C_1$ and $C_2$ may be interpreted according to a new constellation, E. In this case, the constellation E may provide a representation of unique complex values, e.g., for $E=C_1+C_2$, $\forall e_i$, $e_j \in$, $e_i \neq e_j$ for $i \neq j$.

Embodiments relating to multi-TRP transmission with constellation cycling are described herein. TRPs may modulate and transmit repetitions according to multiple different constellation mappings. In some cases, the number of different constellations used, in total among all repetitions, may be fewer than the number of repetitions transmitted.

In a solution, a constellation cycling pattern may be used by the TRPs to send repetitions on a set of time transmission intervals (TTIs) with different constellations. The TRPs may cycle through a series of constellations $\{C_1, C_2, \ldots, C_K\}$ by using a different constellation for the bit-to-symbol mapping step in each TTI transmission interval [1 ... K]. In a multi-TRP scenario with N_TRP coordinating points, a WTRU may receive N_TRP repetitions in one TTI.

Figure 11:
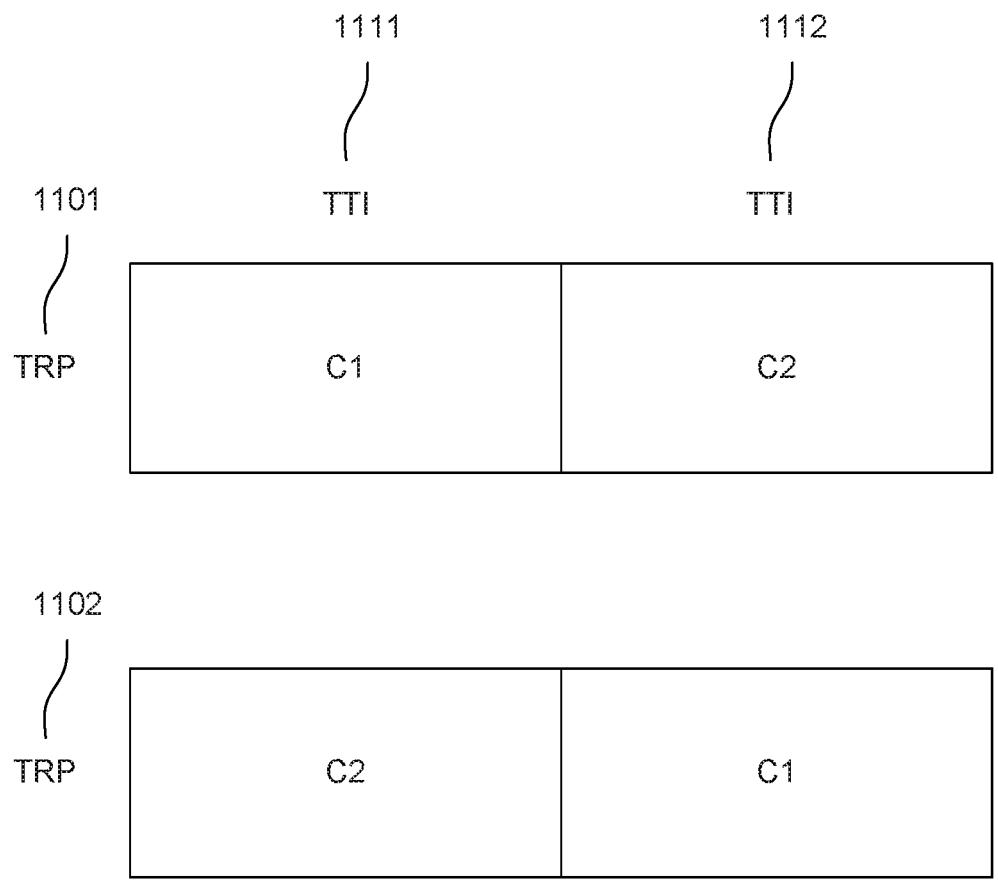
FIG. 11 shows an exemplary case of multi-TRP transmission with four repetitions where only two constellation mappings are considered.
Figure 12A:
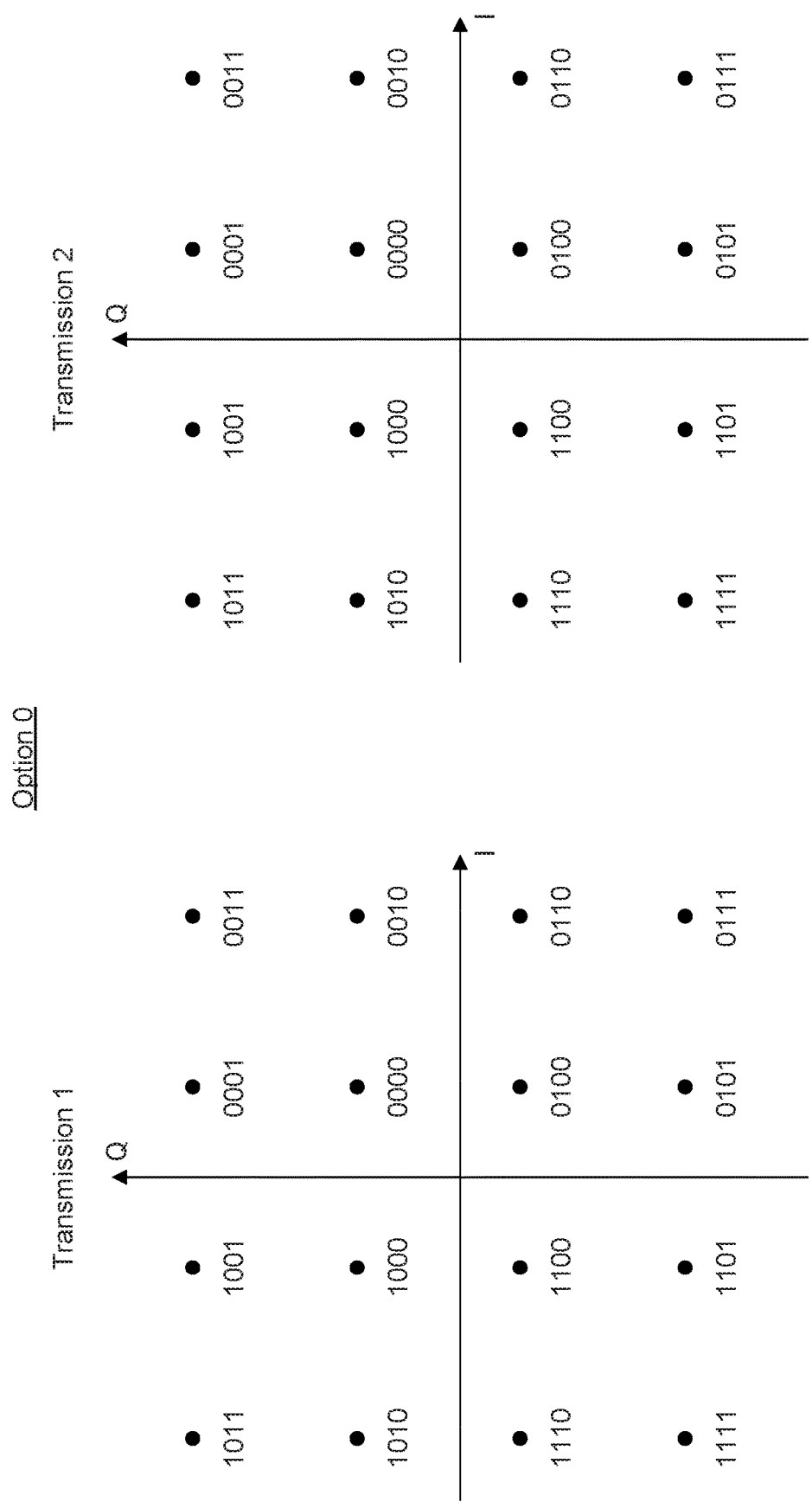
FIGS. 12A through 12M show potential constellation solutions for a system with N=2 dimensions.
Figure 12B:
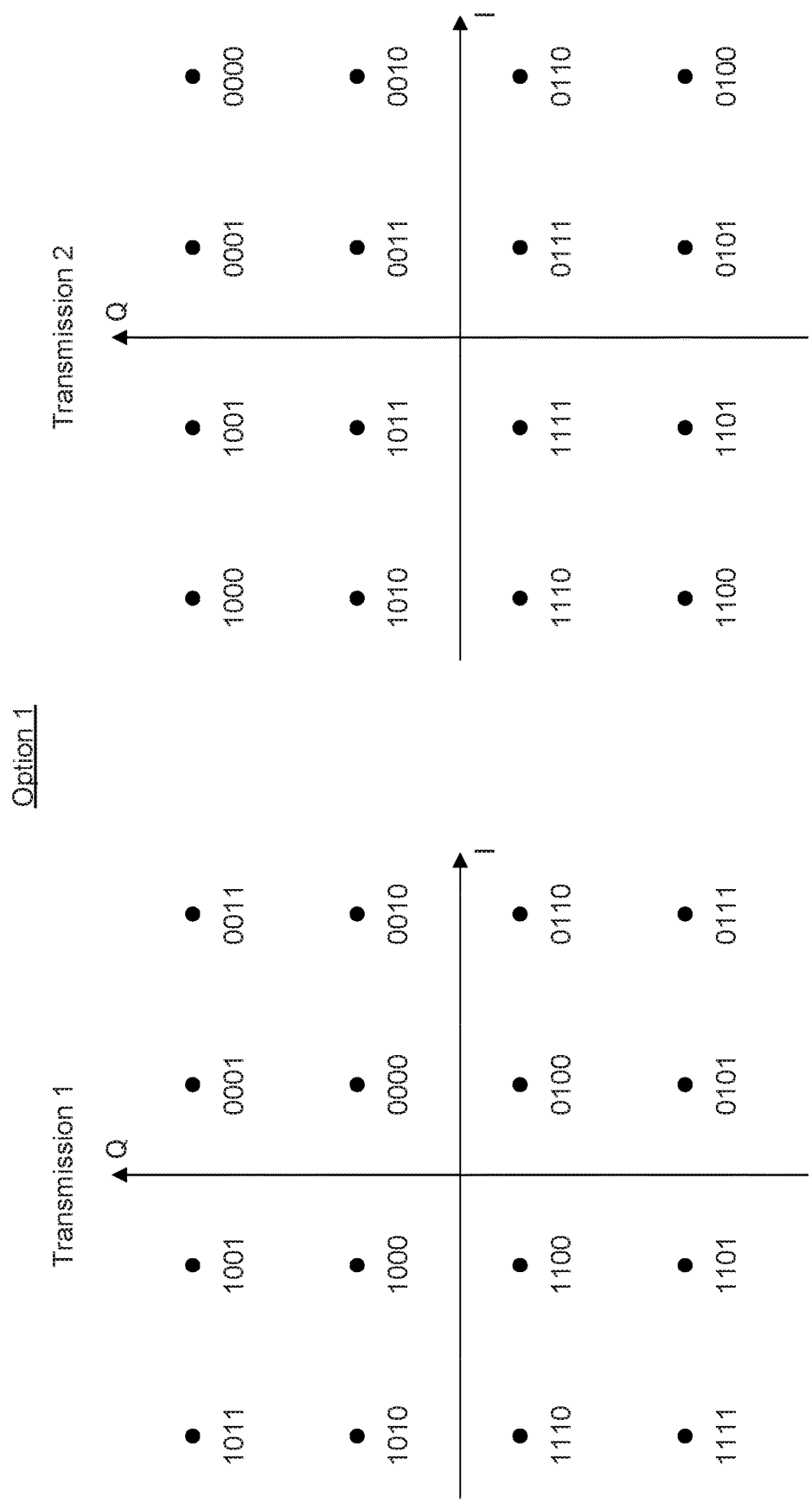
Figure 12C:
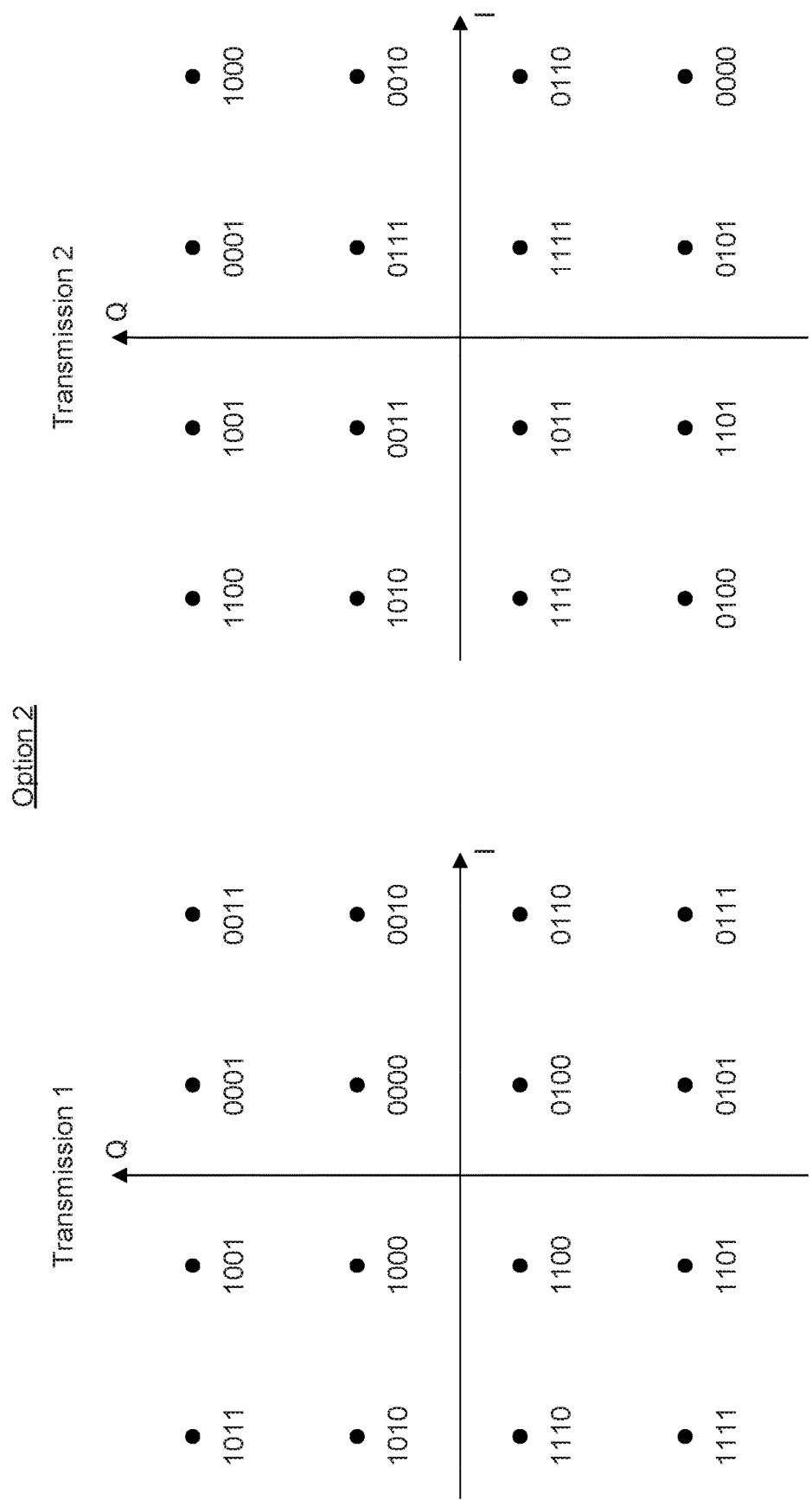
Figure 12D:
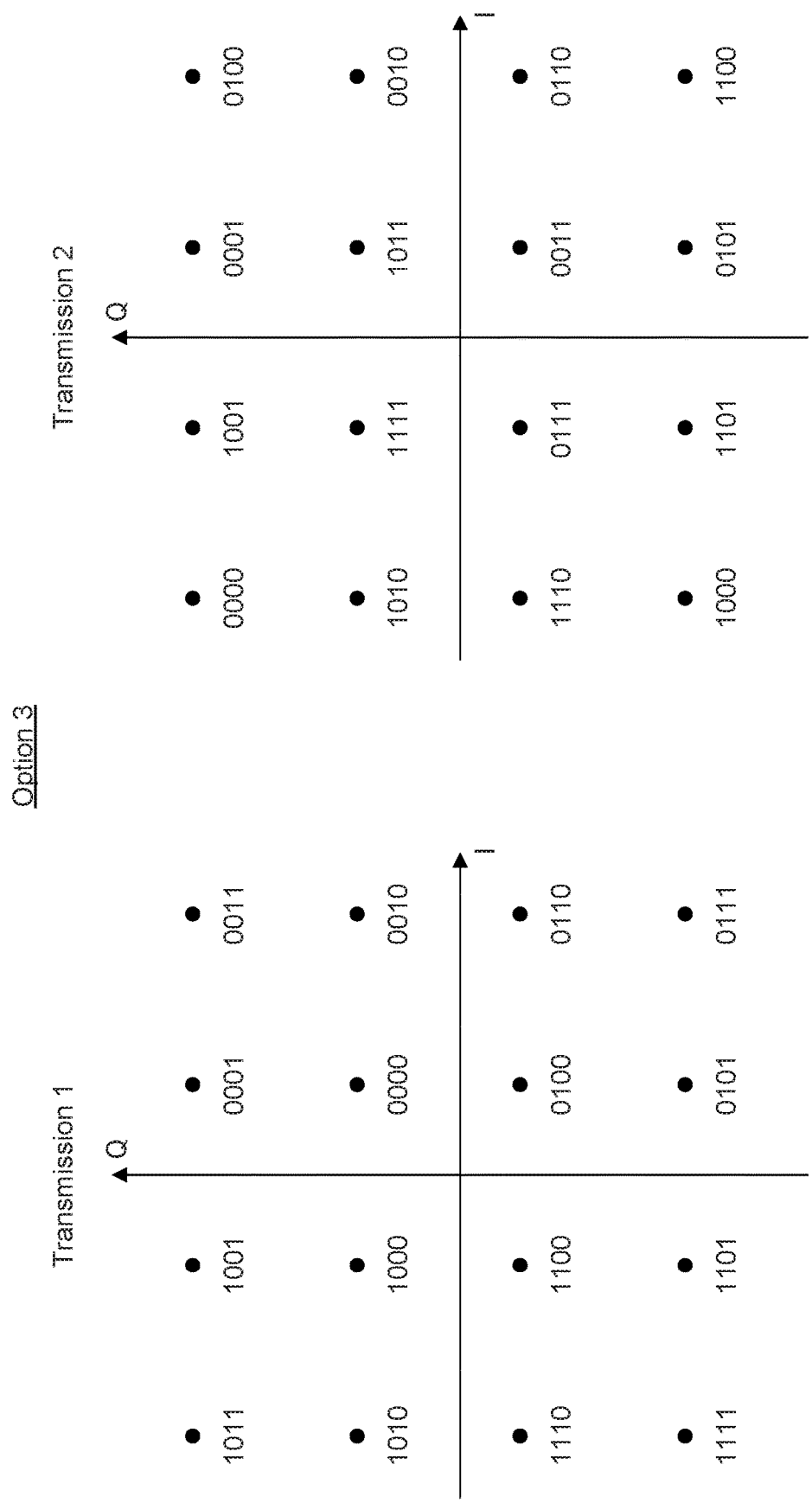
Figure 12E:
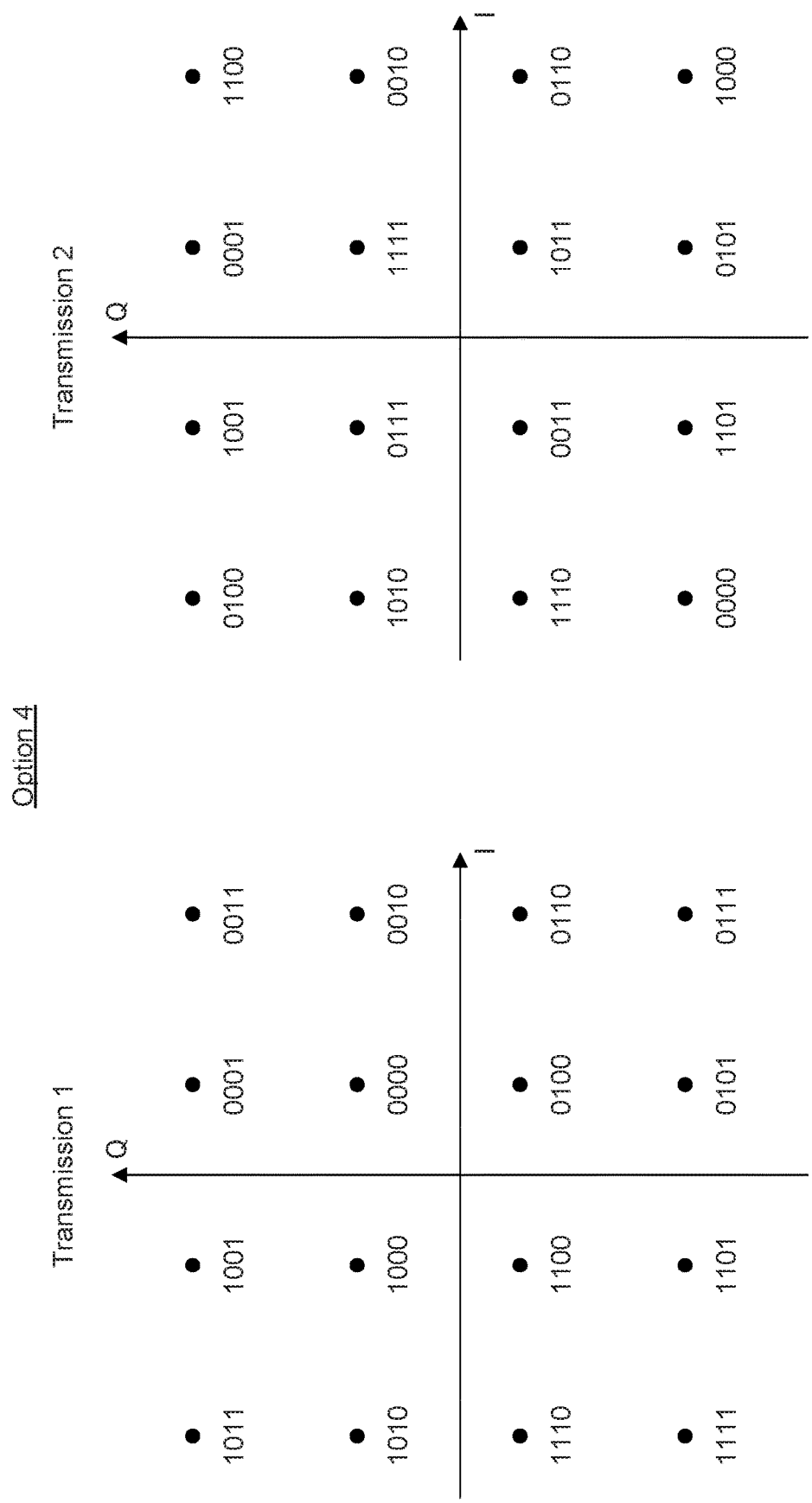
Figure 12F:
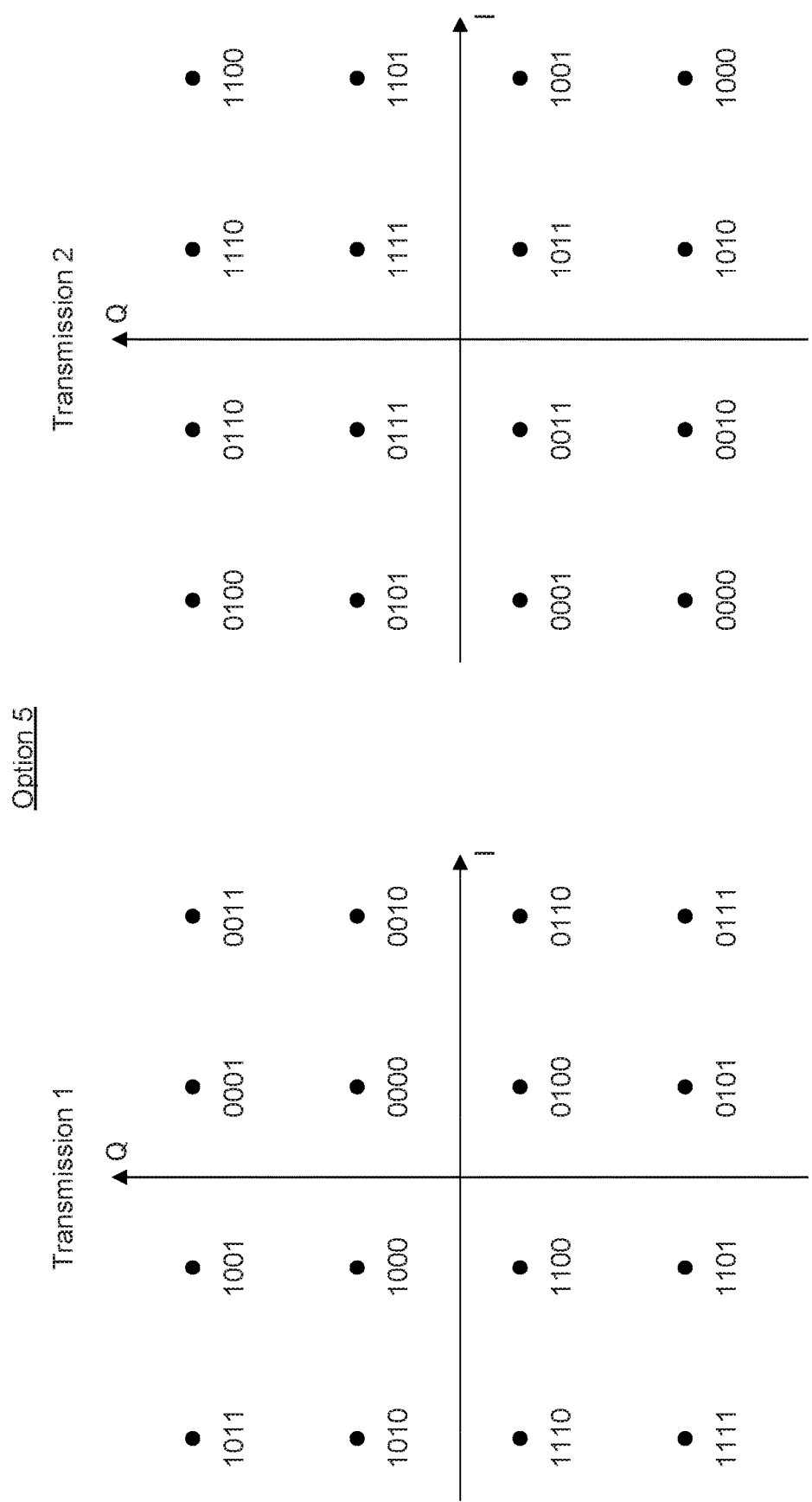
Figure 12G:
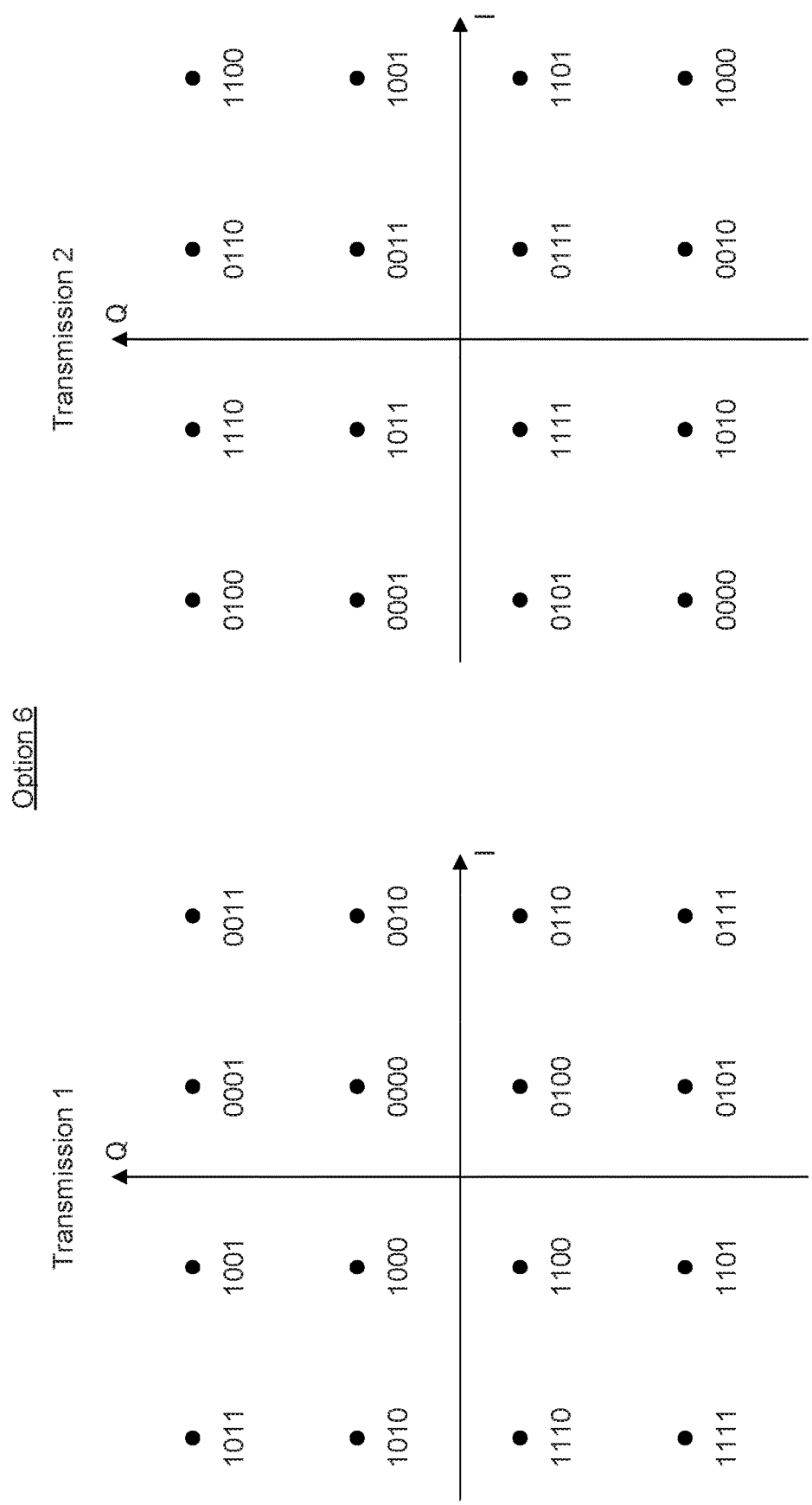
Figure 12H:
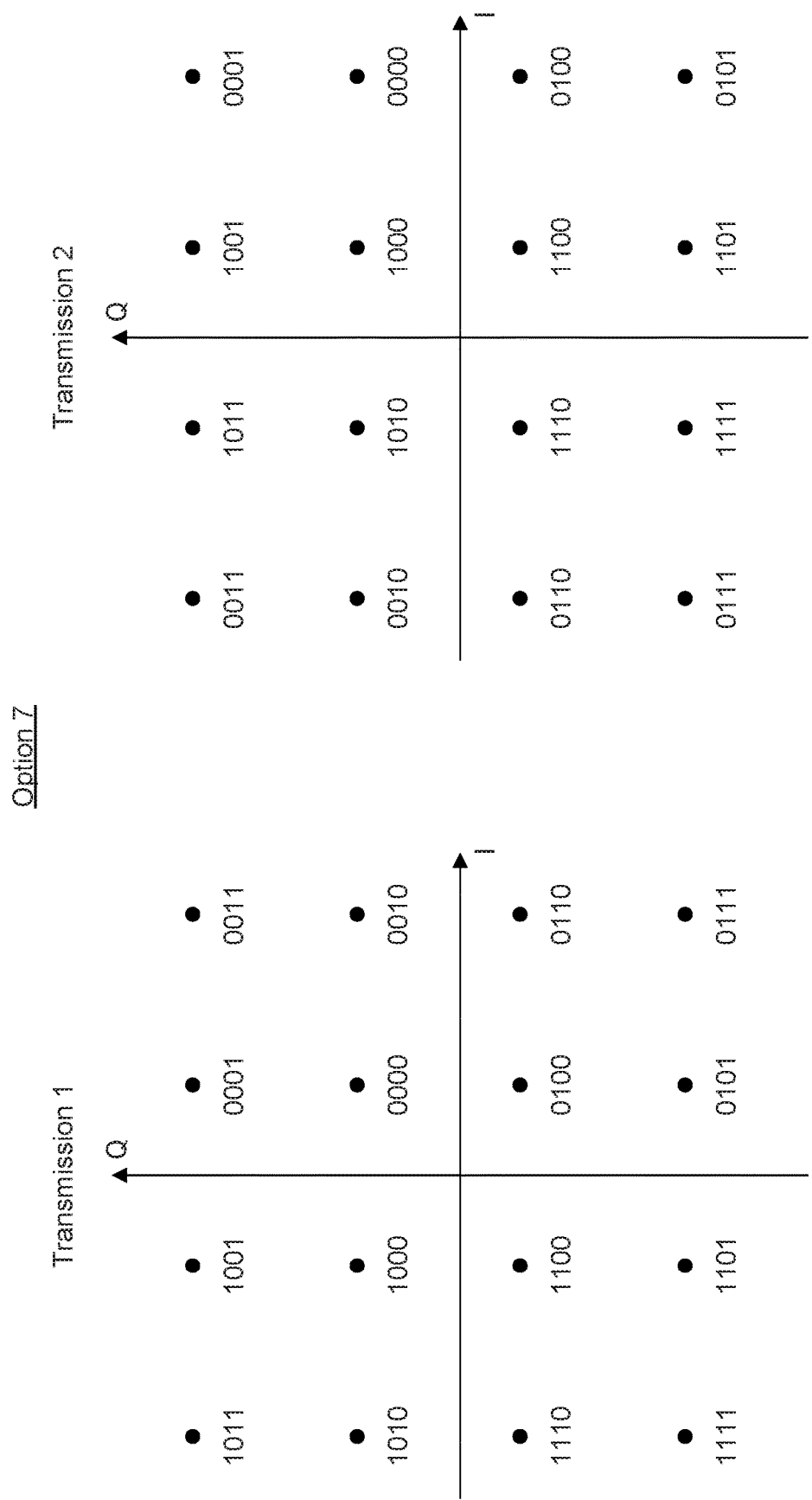
Figure 12I:
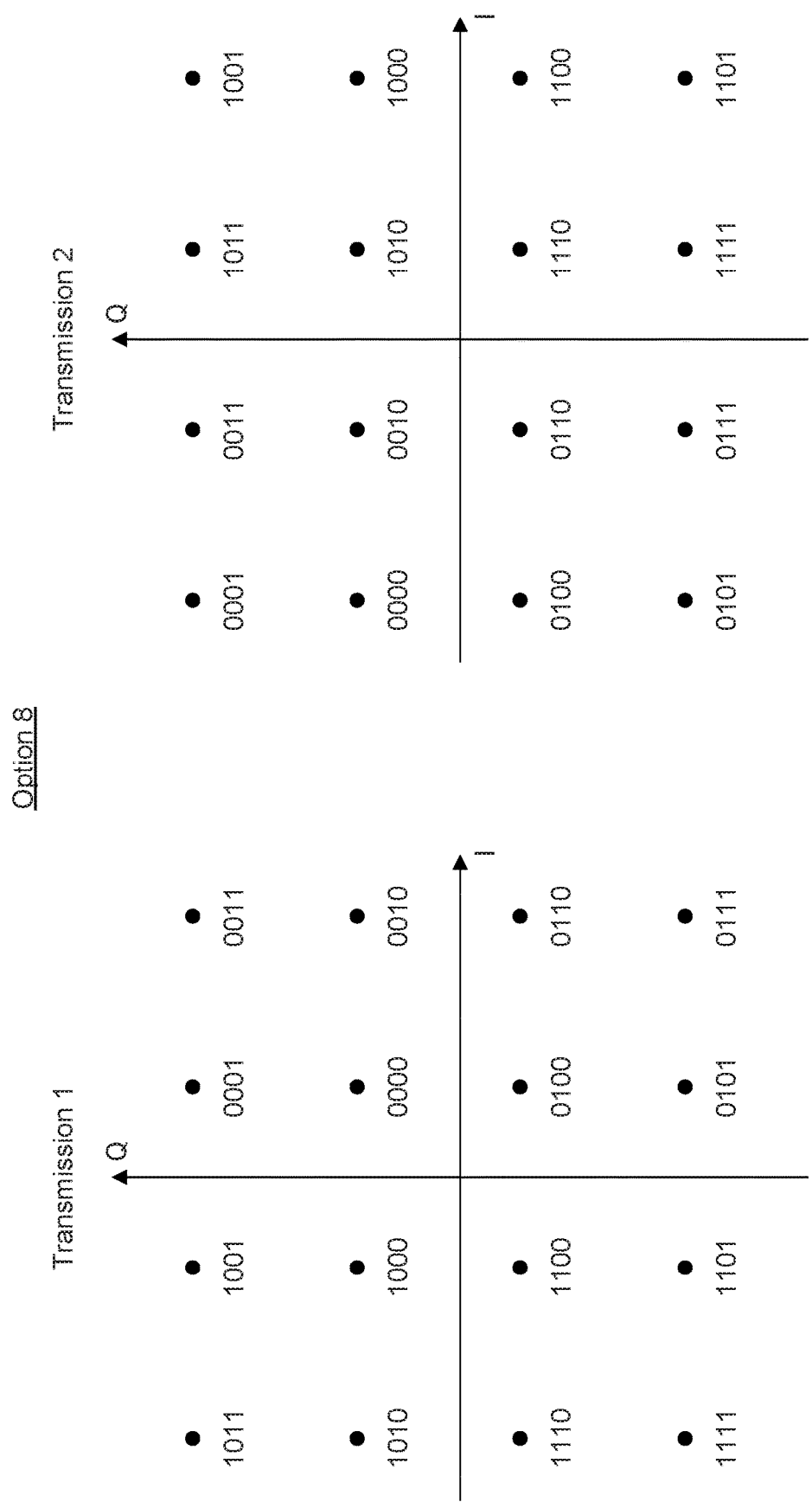
Figure 12J:
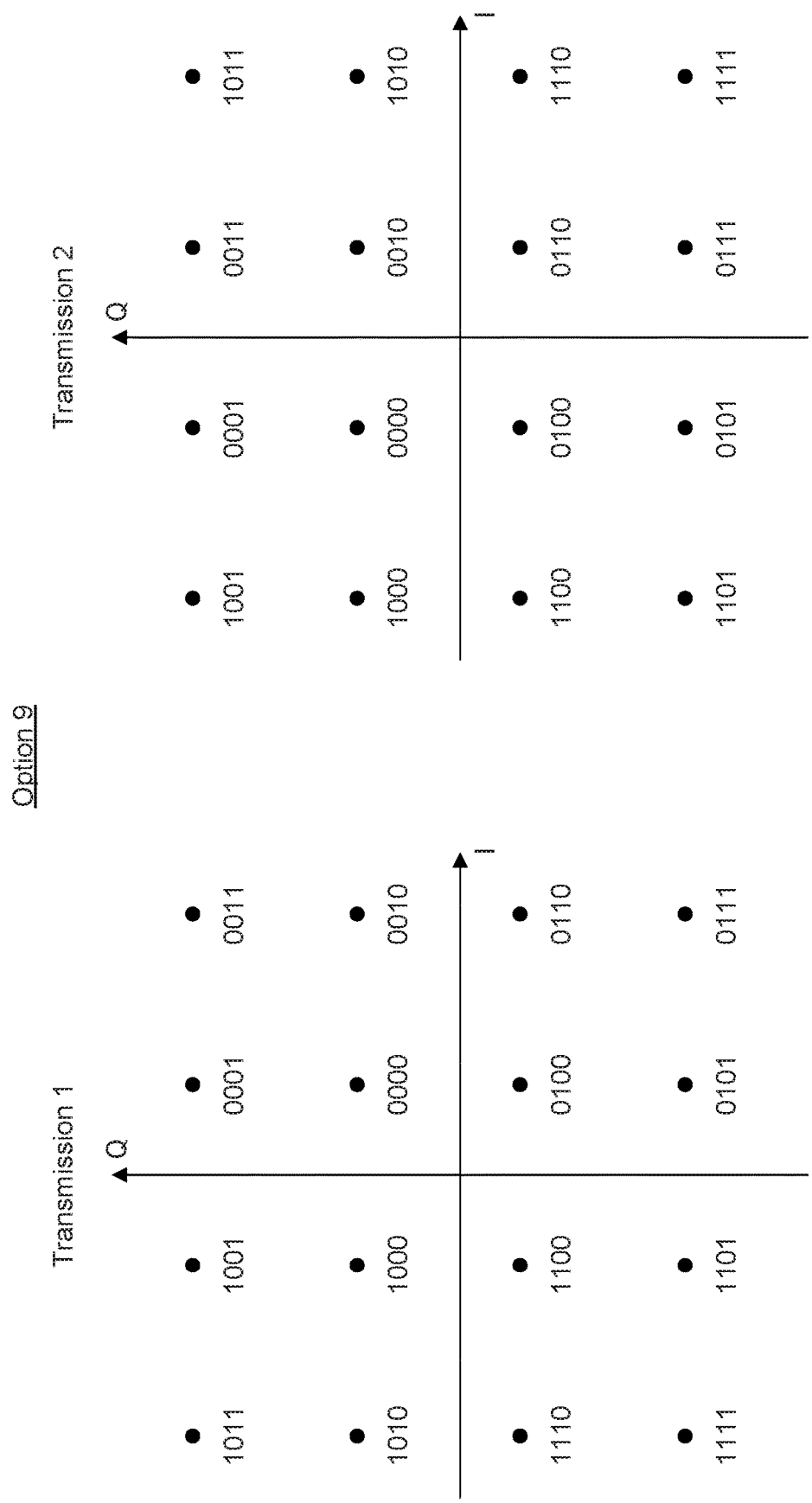
Figure 12K:
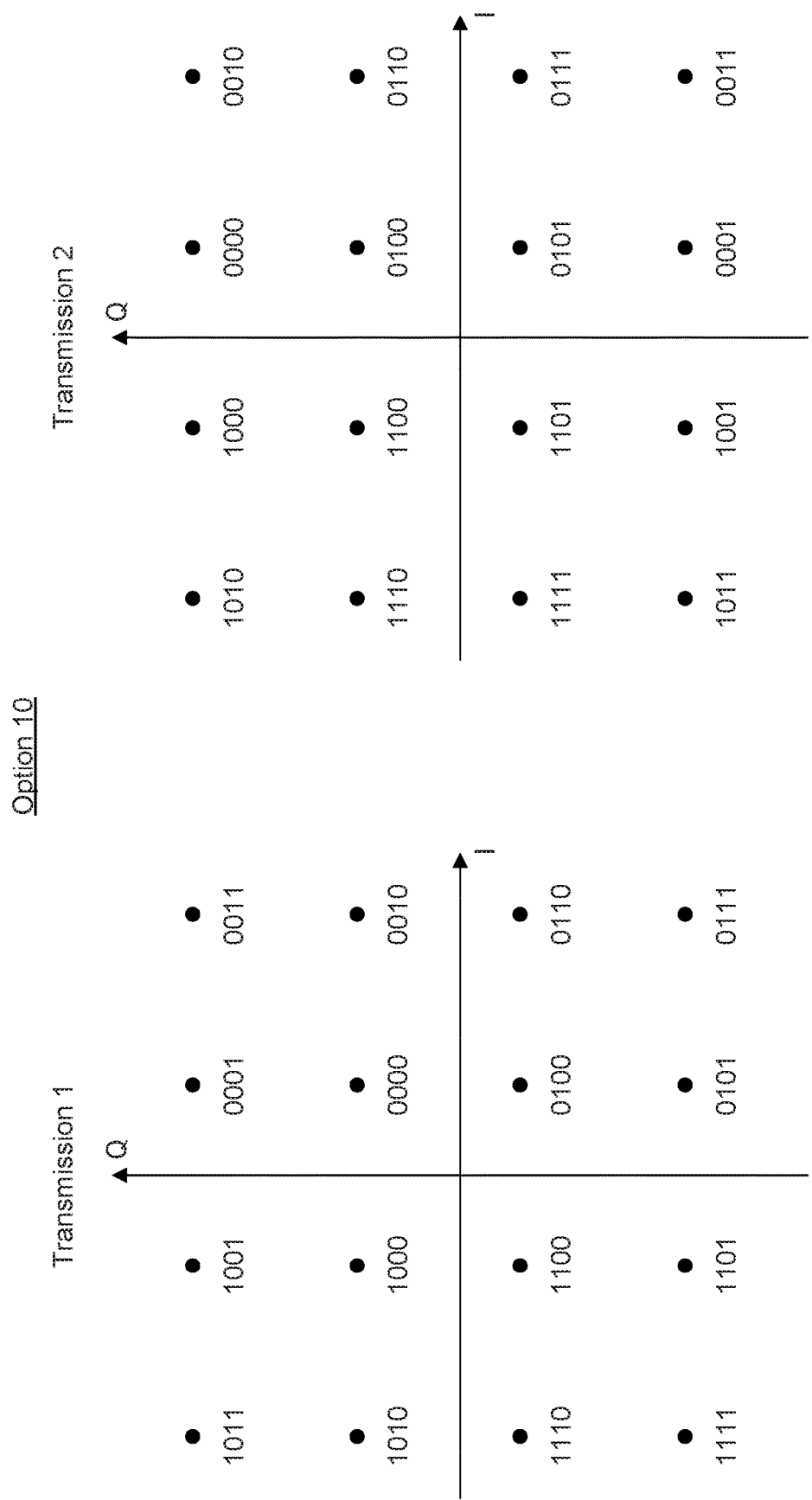
Figure 12L:
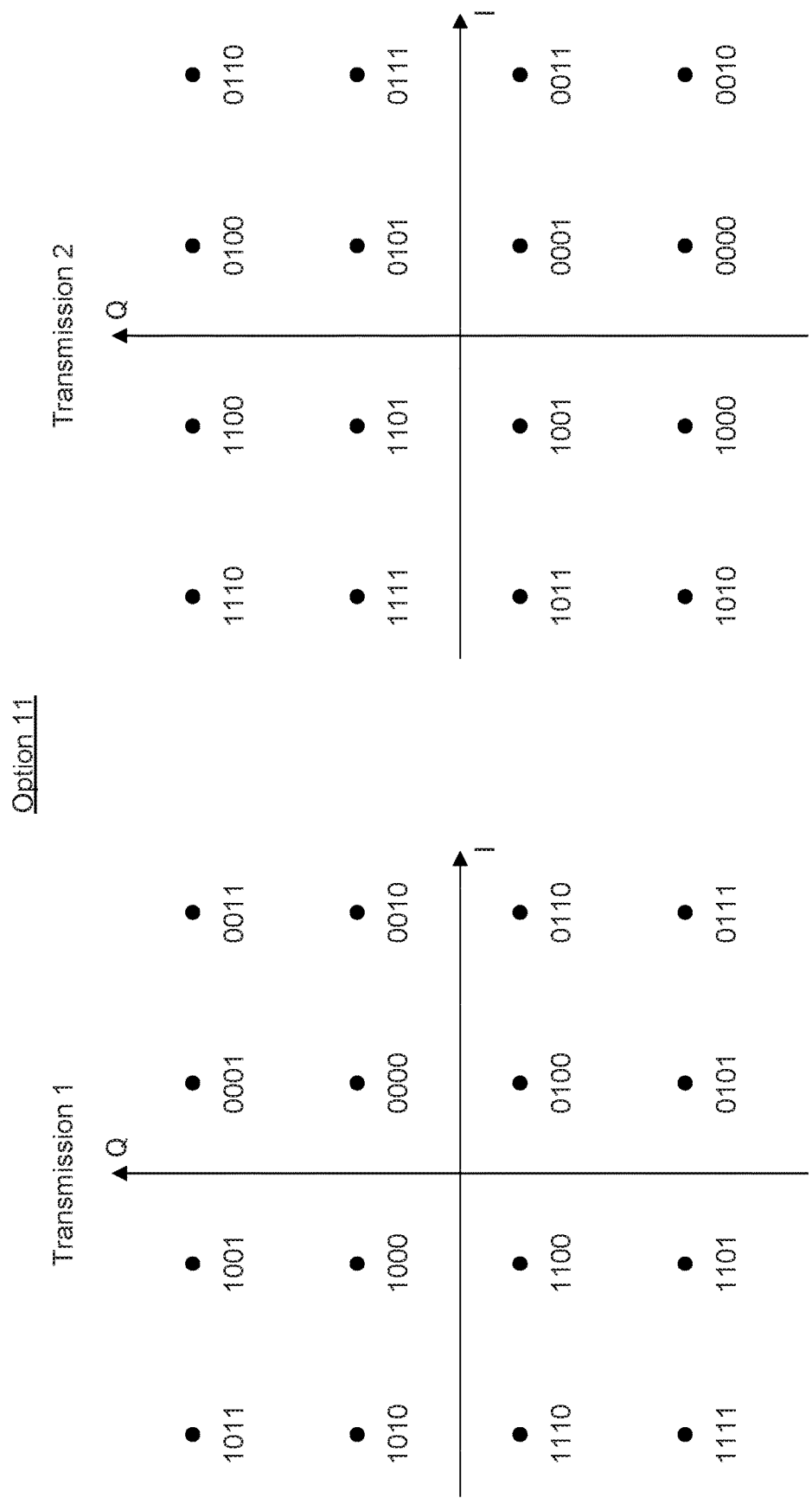
Figure 12M:
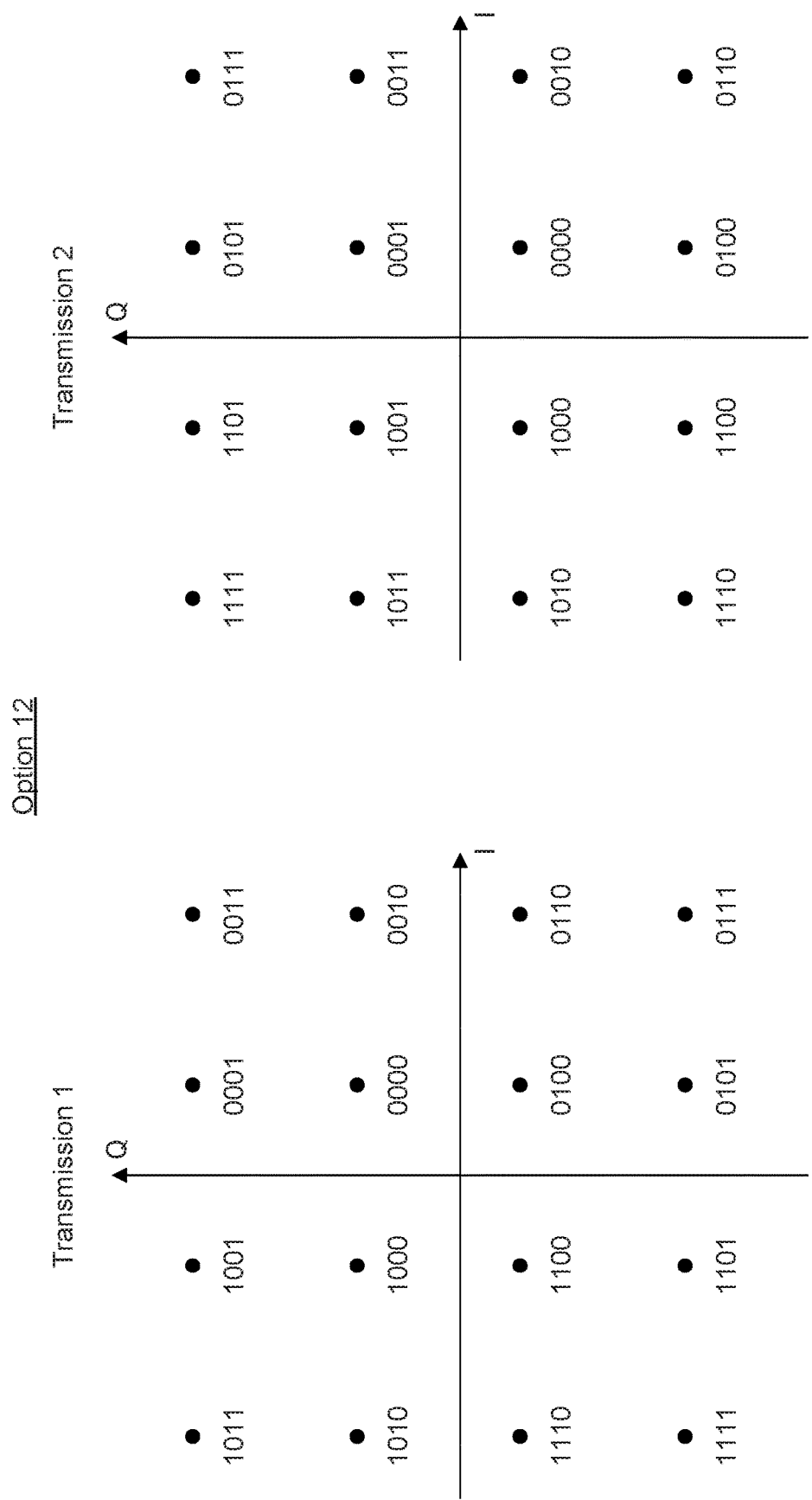

FIG. 11 shows an exemplary case of multi-TRP transmission with four repetitions where only two constellation mappings are considered ($C_1$ and $C_2$). As shown in FIG. 11, during the first TTI 1111 (e.g., slot), TRPs 1101 and 1102 may employ $C_1$ and $C_2$, respectively, while in the second transmission event 1112, the constellations are swapped to $C_2$ and $C_1$. The transmissions from TRP 1101 and TRP 1102 may occur on orthogonal or non-orthogonal sets of resources. In each transmission interval, either transmitted packet using either constellation pair may be self-decodable. Upon the reception of the first packet pair, the WTRU may attempt decoding under the assumption that TRPs 1101 and 1102 transmit two multi-dimensional retransmissions using $C_1$ and $C_2$. If successfully decoded, the WTRU may send an ACK without waiting for the second reception.

A WTRU may determine the pattern of constellation mappings to be used (e.g., a "hopping pattern," or "constellation sequence") by the S-TRP based on the pattern used for the P-TRP. A WTRU may determine the hopping pattern for S-TRP based on a circularly shifted version of the P-TRP pattern. The circular shift index may be based on the TRP index, which may be dynamically indicated in the DCI or semi statically preconfigured. For example, with 2*K repetitions, the P-TRP pattern may use K constellations over K TTIs in the sequence $\{C_1, C_2, \ldots, C_K\}$, while the S-TRP pattern may use the circularly shifted sequence $\{C_K, C_1, C_2, \ldots, C_{K-1}\}$ where the WTRU determined the shift to be equal to (TRP index-1).

Alternatively, a WTRU may determine the constellation sequence for the S-TRP as an offset from the sequence used by the P-TRP. For example, P-TRP may use $\{C_1, C_2, \ldots, C_K\}$, whereas S-TRP may use $\{C_{1+i}, C_{2+i}, \ldots, C_{K+i}\}$. The offset index i may be based on the TRP index, dynamically indicated in the DCI, or semi statically preconfigured.

Alternatively, the WTRU may determine the sequence used by each TRP separately. The sequences may be pre-configured as a pool of sequences, where each sequence may be uniquely identified by an index. The WTRU may determine the index based on the TRP index, dynamically indicated in the DCI, or semi statically preconfigured.

A WTRU may attempt decoding after each TTI, and the WTRU may be triggered to send an ACK if it successfully decodes the transmission before receiving all repetitions. The ACK may indicate to one or more TRPs to cease transmitting repetitions.

Alternatively, the constellations may remain fixed for one TRP while they cycle for the other TRP over several TTIs. For example, From TTI [1 ... K], P-TRP may use C, while the S-TRP cycles through $\{C_2, \ldots, C_{K+1}\}$. The WTRU may determine the periodicity of the cycling per TRP based on a pre-configuration or on the TRP index (e.g., the constellation used by P-TRP may always be fixed).

Various means for designing a constellation mapping are provided herein. In a multi-transmission system, the constellation for each retransmission may be optimized to enhance the performance and reliability of the system. For a constellation design with size M, and assuming N dimensions, (e.g., a number of TRPs or a number of iterations), many solutions may be found to support an enhanced performance compared to the simple time or spatial multi-transmission that relies upon exact retransmission of the payload. Examples of some metrics that may be used to determine and design enhanced constellations include Euclidean and product distances. Distance properties of the constellation designs may be combined with appropriate bit mapping approaches such as Gray coding.

For example, considering an N-dimensional modulation design given by $X^{(i)} \in C^N = [x_{1m}, x_{2m}, \ldots, x_{Nm}]^T$, $m \in \{1, 2, \ldots, M\}$, where $X_i = [x_{1i}, x_{2i}, \ldots, x_{Ni}]^T$ and $X_j = [x_{1j}, x_{2j}, \ldots, x_{Nj}]^T$ are two modulation points, the Euclidean distance can be measured as $d_{ij}^{(l)} = |X_i - X_j| = \sum_{n=1}^{N} \sqrt{|x_{ni} - x_{nj}|^2}$, and, the product distance can be expressed as $P_{ij}^{(l)} = \pi_{n=1}^{N} |x_{ni} - x_{nj}|$.

In FIGS. 12A through 12J, potential constellation solutions for a system with a dimension of N=2 are listed. These solutions may benefit from largest minimum vector distances. In FIG. 12, Option 0 represents a reference two-dimensional system in which two transmissions apply the same constellation mapping (NR, 16QAM).

In a solution for an N-dimensional multi-transmission system that has N≥2, a WTRU may assume that one or more of the constellation mapping options shown in FIG. 12 is used. In a solution, a WTRU may further assume that any of the proposed options in FIG. 12 is used to transmit the repetitions, with further enhancements based on phase rotation, beam/precoder cycling, dynamic resource allocation, among others.

Figure 13A:
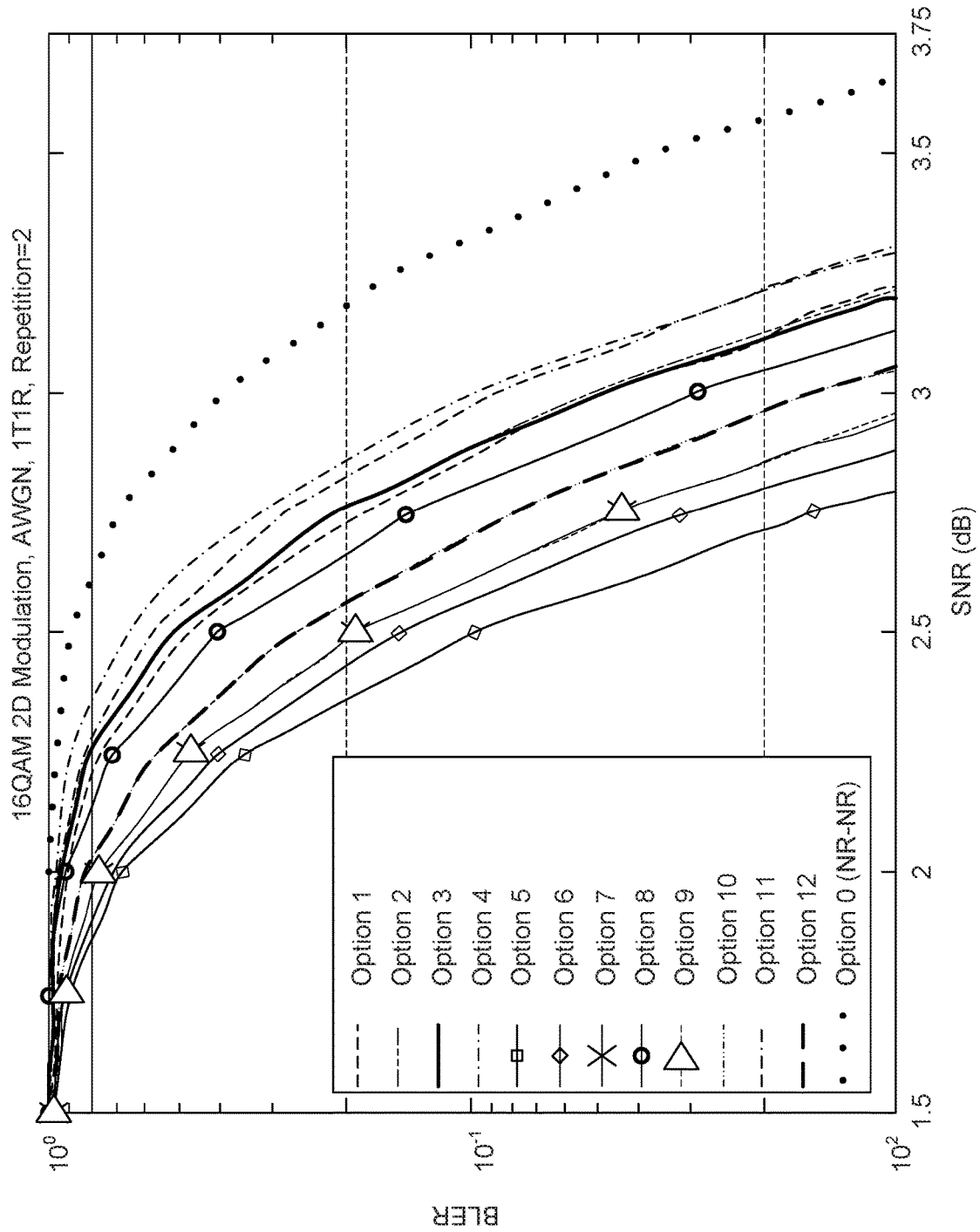
Figure 13C:
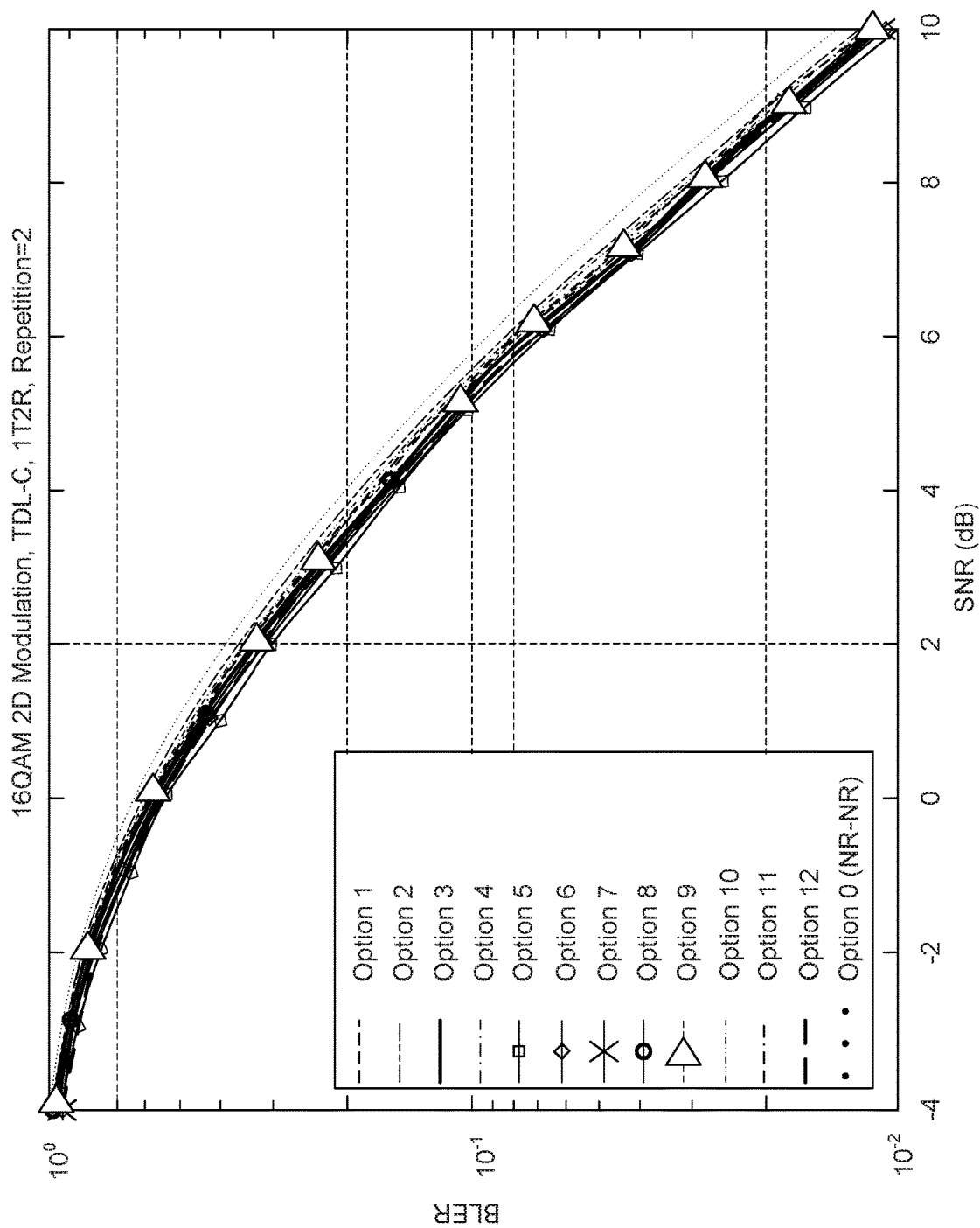

FIGS. 13A through 13C show the achieved performance enhancement based on multi-transmission protocol options presented in FIGS. 12A through 12M. As demonstrated, all presented options in FIGS. 12A-M can provide further enhancement compared to Option 0, while Option 6 may provide the largest gain.

Although features and elements are described above in particular combinations, one of ordinary skill in the art will appreciate that each feature or element can be used alone or in any combination with the other features and elements. In addition, the methods described herein may be implemented in a computer program, software, or firmware incorporated in a computer-readable medium for execution by a computer or processor. Examples of computer-readable media include electronic signals (transmitted over wired or wireless connections) and computer-readable storage media. Examples of computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU, UE, terminal, base station, RNC, or any host computer.

What is claimed:

1. A method for enhancing transmission reliability, the method comprising:
receiving information indicating at least one of a constellation pattern or a plurality of indices associated with a plurality of transmit/receive points (TRPs);
determining, based on the information indicating at least one of the constellation pattern or the plurality of indices associated with the plurality of TRPs, a plurality of constellations for transmitting each of a plurality of repetitions of a data payload to a respective one of the plurality of TRPs, wherein the repetitions of the data payload comprise sets of coded bit sequences;
determining, for each repetition of the data payload, based on one of the sets of coded bit sequences and based on one of the determined plurality of constellations, a set of modulation symbols, wherein at least a first set of modulation symbols and a second set of modulation symbols are different;
allocating time and frequency resources for transmitting the determined sets of modulation symbols; and
transmitting, to the plurality of TRPs, the determined sets of modulation symbols using the allocated time and frequency resources.

2. The method of claim 1, wherein the determined plurality of constellations for transmitting each of the repetitions of the data payload vary based on at least one of a repetition index or a TRP index.

3. The method of claim 1, wherein the determined plurality of constellations are the same for each of the transmissions of the determined sets of modulation symbols.

4. The method of claim 1, further comprising interleaving a set of coded bit sequences prior to determining a set of modulation symbols based on the interleaved set of coded bit sequences and based on one of the determined plurality of constellations.

5. The method of claim 4, further comprising interleaving the set of modulation symbols after determining the set of modulation symbols based on the interleaved set of coded bit sequences and based on one of the determined plurality of constellations.

6. A method for use by a wireless transmit/receive unit (WTRU), the method comprising:
receiving information indicating at least one of a constellation pattern or a plurality of indices associated with a plurality of transmit/receive points (TRPs);
receiving, in downlink transmissions from each of the plurality of TRPs, via allocated time and frequency resources, respective sets of modulation symbols, wherein at least a first one of the sets of modulation symbols and a second one of the sets of modulation symbols are different;
determining, based on the information indicating at least one of the constellation pattern or the plurality of indices associated with the plurality of TRPs, a constellation for each of the sets of modulation symbols, wherein at least two of the determined constellations are different;
demodulating the sets of modulation symbols using the determined constellations to obtain respective sets of coded bit sequences, wherein each of the sets of coded bit sequences corresponds to a repetition of a data payload; and
decoding the coded bit sequences to obtain the data payload.

7. The method of claim 6, wherein the constellation determined for each of the sets of modulation symbols is determined based on at least one of a repetition index or a TRP index.

8. The method of claim 6, wherein the determined constellation is the same for each of the sets of modulation symbols received from a respective TRP.

9. The method of claim 6, further comprising deinterleaving a set of modulation symbols prior to demodulating the set of modulation symbols.

10. The method of claim 9, further comprising deinterleaving a set of coded bit sequences after demodulating a respective set of modulation symbols.

11. A wireless transmit/receive unit (WTRU) comprising:
a transceiver; and
a processor operatively connected to the transceiver, wherein the transceiver and the processer are configured to:
receive information indicating at least one of a constellation pattern or a plurality of indices associated with a plurality of transmit/receive points (TRPs);
receive, in downlink transmissions from each of the plurality of TRPs, via allocated time and frequency resources, respective sets of modulation symbols, wherein at least a first one of the sets of modulation symbols and a second one of the sets of modulation symbols are different;
determine, based on the information indicating at least one of the constellation pattern or the plurality of indices associated with the plurality of TRPs, a constellation for each of the sets of modulation symbols, wherein at least two of the determined constellations are different;
demodulate the sets of modulation symbols using the determined constellations to obtain respective sets of coded bit sequences, wherein each of the sets of coded bit sequences corresponds to a repetition of a data payload; and
decode the coded bit sequences to obtain the data payload.

12. The WTRU of claim 11, wherein the constellation for each of the sets of modulation symbols is determined based on at least one of a repetition index or a TRP index.

13. The WTRU of claim 11, wherein the determined constellation is the same for each of the sets of modulation symbols received from a respective TRP.

14. The WTRU of claim 11, further configured to deinterleave a set of modulation symbols prior to demodulating the set of modulation symbols.

15. The WTRU of claim 14, further configured to deinterleave a set of coded bit sequences after demodulating a respective set of modulation symbols.

16. The method of claim 1, wherein the determined constellations are permutations of a baseline constellation.

17. The method of claim 6, wherein the determined constellations are permutations of a baseline constellation.

18. The WTRU of claim 11, wherein the determined constellations are permutations of a baseline constellation.

* * * * *